United States Patent [19]

Ishii et al.

[11] Patent Number: 5,539,547
[45] Date of Patent: Jul. 23, 1996

[54] LIQUID CRYSTAL DEVICE WITH PLURAL POLYMER NETWORK FILMS

[75] Inventors: Yutaka Ishii, Nara; Yoshitaka Yamamoto, Yamatokoriyama, both of Japan

[73] Assignee: Sharp Kabushiki Kaisha, Osaka, Japan

[21] Appl. No.: 402,971

[22] Filed: Mar. 10, 1995

Related U.S. Application Data

[63] Continuation of Ser. No. 66,310, May 21, 1993, abandoned.

[30] Foreign Application Priority Data

May 22, 1992 [JP] Japan ................................. 4-131127

[51] Int. Cl.⁶ ........................................... G02F 1/1333
[52] U.S. Cl. .............................. 359/51; 359/52; 359/53
[58] Field of Search ............................ 359/51, 53, 52

[56] References Cited

U.S. PATENT DOCUMENTS

| | | | |
|---|---|---|---|
| 5,040,877 | 8/1991 | Blinc et al. | 359/63 |
| 5,157,525 | 10/1992 | Eaton et al. | 359/55 |
| 5,172,164 | 12/1992 | Fujiwara et al. | 355/212 |
| 5,194,973 | 3/1993 | Isogai et al. | 359/53 |
| 5,305,126 | 4/1994 | Kobayashi et al. | 359/52 |
| 5,313,288 | 5/1994 | Takanashi et al. | 358/471 |

FOREIGN PATENT DOCUMENTS

| | | |
|---|---|---|
| 0022311 | 1/1981 | European Pat. Off. ........ 359/53 |
| A0488116 | 6/1992 | European Pat. Off. . |
| 0488164 | 6/1992 | European Pat. Off. . |

OTHER PUBLICATIONS

Japanese Journal of Applied Physics, vol. 31, No. 3B (Mar. 1992) pp. L352–354.
Liquid Crystal Study Group, pp. 306–308 (1991).
Proceedings of the SID. vol. 25/4, pp. 275–280 (1984).
SID Digest, J. Fergason, pp. 68–71, (1985).
"The Corrected papers of Japan Society of Electronic Information and Communication " C–II, J73–II, pp. 703–712 (1990).

Primary Examiner—William L. Sikes
Assistant Examiner—Charles Miller
Attorney, Agent, or Firm—David G. Conlin; George W. Neuner; Milton Oliver

[57] ABSTRACT

To present a liquid crystal device high in contrast, bright and possessing high speed response characteristics, and to present electronic appliances such as liquid crystal display device and image pickup apparatus of high contrast and brightness, copier, printing plate process machine, facsimile communication apparatus, optical communication apparatus and image operation apparatus. A liquid crystal device comprising a pair of substrates forming electrodes respectively on the confronting surfaces, a power supply for applying voltage to the electrodes, and first and second liquid crystal layers interspaced between the pair of substrates, in which the first and second liquid crystal layers are contained in a three-dimensional reticular high molecular weight compound, the directions of orientation of liquid crystal molecules are aligned almost in one direction, and the directions of their orientations are mutually different near the substrates.

18 Claims, 13 Drawing Sheets

ELECTRIC FIELD ON
(TRANSPARENT STATE)

ELECTRIC FIELD OFF
(SCATTERED STATE)

LIQUID CRYSTAL DEVICE WITH PLURAL POLYMER NETWORK FILMS

This is a continuation of application Ser. No. 08/066,310 filed on May 21, 1993, now abandoned.

BACKGROUND OF THE INVENTION

1. Field of the Invention

The present invention relates to a novel liquid crystal device that can be used as a display device or color variable filter and can be applied in wide uses including consumer industrial merchandise, professional merchandise and communication merchandise, and an electronic apparatus using the same.

2. Description of the Related Art

The LCD (liquid crystal display device) which is an article using liquid crystal has recently been used widely in pocket calculator, clock, word processor, television receiver, etc.

From the technical point of view, the existing LCD's may be classified into two categories. One is a simple matrix driving method for driving the liquid crystal by time division, which is a simple structure formed by gluing a pair of light transmittable substrates forming plural band-shaped transparent electrodes respectively, and the other is an active matrix driving method for driving each picture element in a form apparently close to static driving, by adding nonlinear elements such as thin film transistor (TFT) and diodes to the display picture element parts. The display quality is superior in the latter active matrix driving method, but the former simple matrix driving method is advantageous in the aspect of cost.

Incidentally, the liquid crystal display mode is known as one of the important factors that determine the display quality. At the present, in the active matrix driving LCD, the so-called twisted nematic (TN) mode having a twisting of 90 degrees in the initial (non electric-field state) liquid crystal orientation is generally employed, and in the simple matrix driving type LCD, the super twisted nematic (STN) mode having the twisting angle of liquid crystal set somewhere between 180 degrees and 270 degrees is widely utilized.

In the latter STN mode, the method of putting a liquid crystal panel or phase difference film further on the liquid crystal device of STN mode (STN cell) for the purpose of optical compensation (known as DSTN method or FSTN method) is applied as display device for word processor and notebook type personal computer.

As another method, in a limited application range such as clock, the guest-host (GH) mode having a dichroic pigment added to the liquid crystal is known. This method is, as compared with the TN mode or STN mode, capable of presenting a bright display device of wide viewing angle, when considered by including the mode capable of displaying without requiring polarizer plate by applying a twisting to the liquid crystal orientation (White-Taylor type GH mode), but is inferior in contrast.

In these display modes developed hitherto, it is commonly demanded to enhance the response speed. By the improvements of liquid crystal material and cell composition, it is enhanced to scores to hundreds of milliseconds at the present, but it is not enough yet for display of moving pictures, especially in the display device using the so-called mouse system or applied merchandise where high speed optical shutter is indispensable.

To meet such needs, lately, liquid crystals possessing high speed response characteristics have been proposed. In one of them, asymmetric carbon is added to the liquid crystal molecular skeleton, and the liquid crystal expressing ferroelectric property thereby (a ferroelectric liquid crystal) is used. In this method, a ferroelectric liquid crystal is sealed over the liquid crystal panel having a gap of 1 to 2 μm, and the display is offered by making use of birefringence property of the liquid crystal itself and the mutual interference of the polarity of applied voltage and molecular orientation of liquid crystal (surface stabilized ferroelectric liquid crystal: SSF-LC).

The SSF-LC possesses a responses speed of scores to hundreds of microseconds, and exhibits a high speed with a difference of several digits as compared with the conventional nematic liquid crystal, and also possesses memory characteristics, and hence it is expected as a display device of next generation.

However, it has its own disadvantages, such as vulnerability to mechanical impact, requirement of advanced technology in control of liquid crystal orientation, tendency of contrast drop when driving, and large dependence of characteristics on temperature, and it is far from the practical level at the present.

As another method, the liquid crystal/high-molecular compound film dispersing liquid crystal drops of micron size order in high molecular weight matrix is proposed. This is classified in two types depending on the method of manufacture, that is, liquid crystal drops are completely enclosed in the high molecular matrix to be in an isolated state in one type, while the liquid crystal is not isolated but is included in the three-dimensional reticular high molecule in the other type. In either type, since the liquid crystal is enclosed in a tiny space, the response characteristics of higher speed than before are realized, practically in the order to milliseconds.

FIG. 19 shows the principle of operation of the liquid crystal device of liquid crystal drops in an isolated state in the high molecular matrix. The liquid crystal device is composed of plural liquid crystal drops 17 interspaced between light transmittable substrates 15, 16 forming transparent electrodes on the confronting surfaces, respectively. An AC voltage from a power source 18 is selectively applied to the transparent electrodes of the light transmittable substrates 15,16 by a switch 19.

As shown in FIG. 19(a), in a non electric-field state, since the liquid crystal molecules are arranged irregularly in the liquid crystal space, and the incident light is scattered, and a white turbid state is recognized as a result.

However, when a sufficiently high voltage is applied, supposing the liquid crystal used herein possesses a positive dielectric anisotropy ($\Delta\epsilon=\epsilon a-\epsilon b>0$, $\epsilon a$: dielectric constant of liquid crystal molecule along the optical axis of liquid crystal molecule, $\epsilon b$: dielectric constant normal to the optical axis, the orientation is re-aligned in the direction of electrolysis), so that a transparent state is obtained.

Thus, by application/elimination of voltage, the transparent/opaque state can be changed over at a speed in the order of milliseconds. This display mode, however, has its own problems in the display characteristics, such as difference in transmissivity in the ascending and descending stroke of voltage, that is, the hysteresis characteristics, and difficulty in elevation of resistance as liquid crystal panel.

In the display device or photo modulation device, liquid crystal device of high contrast and brightness (high transmissivity) and having response characteristics of high speed are desired.

From this point of view, as the liquid crystal display mode, between the display modes of using the polarizer plate and not using the polarizer plate, the latter display mode without requiring polarizer plate is more advantageous. That is, by using the polarizer plate, the optical utility is at least decreased below 50% due to the optical property of the polarizer plate itself. Therefore, as the display mode, the White-Taylor type GH mode twisting and orienting the material having pigments added to liquid crystal, and the liquid crystal/high-molecular compound film are considered.

In the White-Taylor type GH mode, it is known that the response speed in the order of microseconds can be obtained by increasing the angle of twisting orientation and orienting vertically on the substrate, but the shortcoming is that a high contrast cannot be obtained. On the other hand, it is reported that the contrast is reported by designing a two-layer type GH mode (PROC. of the SID, 25/4,1984, p. 275). In the two-layer type GH mode, however, since an ordinary glass substrate is used between liquid crystal layers, a parallax is caused in the upper and lower liquid crystal layers depending on the viewing angle, and the display may be blurry.

Meanwhile, in the display mode using liquid crystal/high-molecular compound film as shown in FIG. 19, there are basic problems such as hysteresis characteristic, difficulty in elevation of resistance of liquid crystal panel, poor reliability.

SUMMARY OF THE INVENTION

It is hence a primary object of the invention to present a liquid crystal device high in contrast and brightness and possessing high speed response characteristics, and moreover to present, by using the liquid crystal device, an electronic apparatus such as liquid crystal display device, image pickup device, copier, printing plate process device, facsimile communication apparatus, optical communication apparatus and image operation means of high contrast and brightness.

The invention presents a liquid crystal device having:
a pair of substrates having electrodes formed on confronting surfaces,
means for applying voltage to the electrodes, and
a liquid crystal interposed between the pair of substrates, wherein
the liquid crystal is contained in a high-molecular compound, the directions of orientation of liquid crystal molecules are aligned almost in one direction, and the directions of orientation are mutually different near each substrate.

In the invention, the liquid crystal comprises a dichroic pigment.

The invention presents a liquid crystal device comprising:
a pair of substrates disposed oppositely,
a pair of transparent electrodes respectively formed on the confronting surfaces of the pair of substrates,
a pair of orientation films respectively formed on the surfaces of the pair of electrodes,
means for applying voltage to the pair of electrodes, and
a liquid crystal interposed between the pair of substrates, wherein
the liquid crystal is formed by stacking two liquid crystal layers,
each liquid crystal layer is composed by containing liquid crystal molecules in the polymer network, and the directions of orientation of liquid crystal molecules are almost aligned in one direction, and
the directions of orientation of liquid crystal molecules of each liquid crystal layer are mutually crossing orthogonally.

In a first embodiment of the invention, the liquid crystal layers contain a liquid crystal of which dielectric constant is positive, and the molecules are in horizontal orientation state when no voltage is applied.

In a second embodiment of the invention, the liquid crystal layers contain a liquid crystal of which dielectric constant is negative and the molecules, are in almost vertical orientation state when no voltage is applied.

The invention presents a display apparatus for displaying the light from one light source containing wavelengths of plural colors by irradiating to display means of transmission type or reflection type and photo modulation device, and
the display means displays images corresponding to the plural colors sequentially within a period of after-image effect, and the photo modulation device changes the colors of the transmitted light in every display period of image of each color, wherein
the photo modulation device comprising
plural liquid crystal devices thus composed, and
changeover means for changing over the driving voltage applied to each liquid crystal element in plural different states, and changing over so that each liquid crystal element may transmit light of mutually different wavelengths or transmit light of an arbitrary wavelength.

The invention also presents a photo detector having an optical detecting means for producing a detection signal corresponding to the intensity of incident light and a photo modulation device disposed at the incident side of the optical detecting means, wherein
the photo modulation device comprising
plural liquid crystal devices thus composed, and
changeover means for changing over the driving voltage applied to each liquid crystal device in plural different states, and changing over so that each liquid crystal device may transmit light of mutually different wavelengths or transmit light of an arbitrary wavelength.

The invention also presents a color copier having one light source for generating light containing wavelengths of plural colors, a document, photoelectric converting means for forming optical image of the document and converting optical image into electric signal and a photo modulation device disposed either between one light source and the document or the document and the photoelectric converting means, and further comprising
means for forming color image on a recording medium by using developers of plural colors on the basis of the electric signal obtained in the photoelectric converting means, wherein
the photo modulation device comprising
plural liquid crystal devices thus composed, and
changeover means for changing over the driving voltage applied to each liquid crystal device in plural different states, and changing over so that each liquid crystal device may transmitted light of mutually different wavelengths or transmitted light of an arbitrary wavelength.

The invention presents a printing plate process machine having one light source for generating light containing wavelengths of plural colors, a document, photoelectric converting means for forming optical image of the document and converting optical image into electric signal and a photo modulation device disposed either between one light source and the document or the document and the photoelectric converting means, and further comprising plate material processing means for forming a document image of each color on plate materials of plural colors used as printing plates on the basis of the electric signal obtained from the photoelectric converting means, wherein the photo modulation device comprising
plural liquid crystal devices thus composed, and
changeover means for changing over the driving voltage applied to each liquid crystal device in plural different states, and changing over so that each liquid crystal device may transmitted light of mutually different wavelengths or transmitted light of an arbitrary wavelength.

The invention moreover presents an image input/output apparatus for picking up the object in every one of plural colors by pickup means through a photo modulation device, storing the image data from the pickup means in the image memory in each color, and feeding color images, or displaying the image by display means on the basis of image data of each one of plural colors stored in the image memory, and changing over the colors of transmitted light by the photo modulation device, thereby producing a color image, wherein the photo modulation device comprising
plural liquid crystal devices thus composed, and
changeover means for changing over the driving voltage applied to each liquid crystal device in plural different states, and changing over so that each liquid crystal devices may transmitted light of mutually different wavelengths or transmitted light of an arbitrary wavelength.

The invention presents an image operation apparatus comprising:

a light source generating light of plural wavelengths, a photo modulation device for transmitting only the specific wavelength portion of the light from the light source, and plural display devices of transmission type or reflection type for transmitting or reflecting the light of one specific wavelength portion corresponding to the display image, and transmitting or reflecting the light of the remaining wavelength portions, wherein the photo modulation device comprising
plural liquid crystal devices thus composed, and
changeover means for changing over the driving voltage applied to each liquid crystal device in plural different states, and changing over so that each liquid crystal device may transmitted light of mutually different wavelengths or transmitted light of an arbitrary wavelength.

The invention also presents a lighting apparatus for irradiating the light from a light source generating light containing wavelengths of plural colors as the light of one of plural colors through a photo modulation device, wherein the photo modulation device comprising
plural liquid crystal devices thus composed, and
changeover means for changing over the driving voltage applied to each liquid crystal device in plural different states, and changing over so that each liquid crystal device may transmit light of mutually different wavelengths or transmit light of an arbitrary wavelength.

According to the invention, between a pair of substrates composing a liquid crystal device, the directions of orientation of liquid crystal molecules are aligned almost in one direction, and the liquid crystals contained in the high molecular weight compound are almost in two-layer structure, and the directions of orientation of the liquid crystal layers are different. Characteristically of this liquid crystal device, when a low voltage is applied, since the liquid crystal molecules are arranged irregularly by the defining force of the horizontal orientation, the light transitting the first layer (the liquid crystal layer close to the incident side light transmissive substrate) shows a wide scatter in the extraordinary light beam direction (the longer axis direction of liquid crystal molecule), and is not scattered in the ordinary light beam direction (the shorter axis direction of liquid crystal molecule). However, by passing through the second layer (the liquid crystal layer close to the exit side light transmissive substrate), the ordinary light beam direction coincides with the extraordinary light beam direction, and the light is scattered, and finally all light beam components are scattered. When a sufficiently high voltage is applied, the liquid crystal molecules in the first and second layers are all aligned in the direction of electric field, and the light is not scattered so that a transparent state is set up.

In the invention, moreover, the liquid crystal device is composed of liquid crystal adding dichroic pigment. As a result, in principle, the same characteristics as in the conventional two-layer type GH mode will be obtained. In other words, for example, while the light absorption axes of the first layer and second layer are nearly orthogonal to each other, the natural light is absorbed efficiently when low voltage is applied. On the other hand, when a sufficiently high voltage is applied, since the liquid crystal molecules are aligned in the direction of electric field, and pigments are also oriented again in this direction of electric field, so that light is hardly absorbed.

Moreover, according to the invention, the liquid crystal device may be widely used in display device of transmission type, reflection type or projection type, optical apparatus requiring optical shutter function and filter function, for example, image pickup device, copier and printing plate process machine, and many other electronic appliances.

Thus, in the invention, without sacrificing the features of high speed response performance of the conventional liquid crystal/high-molecular compound film, the problems of the compound film, such as hysteresis characteristics, low contrast, and low resistivity may be solved.

Therefore, monochromatic or full color bright moving pictures can be displayed, and it can be applied to various audio-visual appliances and multimedia appliances. Furthermore, by applying the photo modulation function of the liquid crystal device of the invention, it can be used not only in display devices, but also in image pickup device, copier, printing plate process machine, facsimile communication apparatus, optical communication apparatus, image operation apparatus, and other electronic appliances, and it brings about outstanding effects in higher image quality, higher performance, smaller size of apparatus, and higher reliability.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
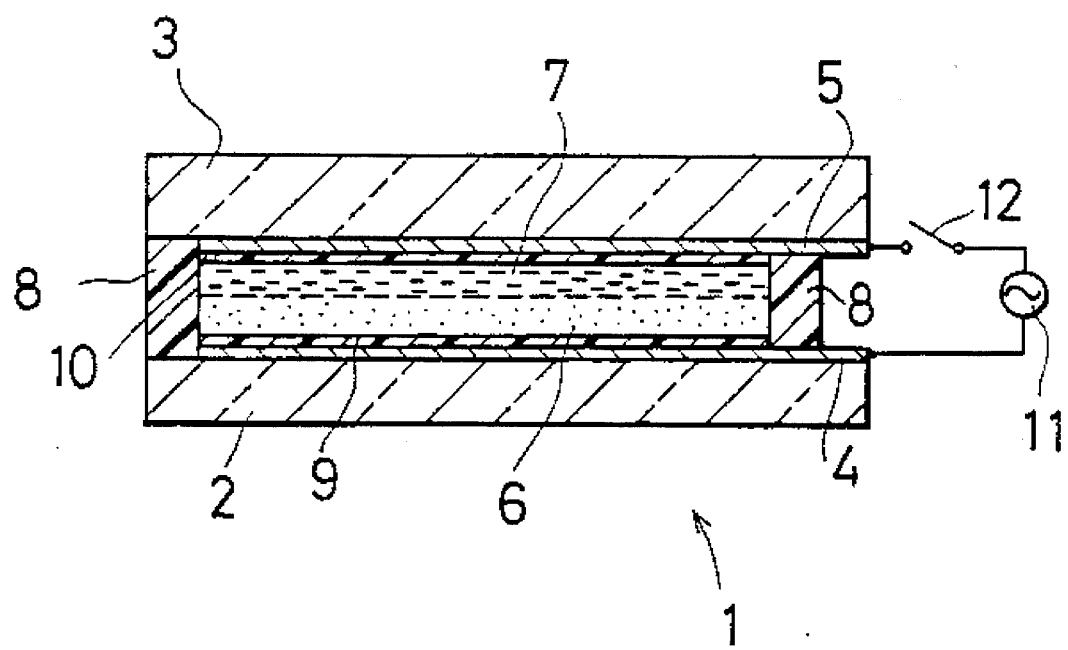
FIG. 1 is a sectional view showing the structure of a liquid crystal device 1 as an embodiment of the invention.

Now referring to the drawing, preferred embodiments of the invention are described below.

Between a set of oriented substrates (at least one of which is a transparent substrate), a uniform solution of liquid crystal and polymerizing compound is injected, and the polymerizing compound is cured by UV (ultraviolet rays) or heat, then the compound is oriented according to the orientation field of the liquid crystal, so that the polymer network may be provided with an environment for aligning the molecules of the liquid crystal in one direction. By making use of this action, polymer network films precured in different orientation directions between the two substrates are joined together, and by injecting and sealing a desired liquid crystal between these films, an electro-optical effect of liquid crystal not found before may be expressed.

FIG. 1 is a sectional view showing the structure of a liquid crystal device 1 in an embodiment of the invention. The liquid crystal device 1 is composed by forming transparent electrodes 4, 5 on the confronting surfaces of a pair of light transmittable substrates 2, 3, forming orientation films 9, 10 further thereon, and placing a first liquid crystal layer 5 and second liquid crystal layer 7 in an enclosed space formed by the light-transmissive substrates 2, 3 and sealing member 8. To the transparent electrodes 4, 5, a voltage from a power source 11 is selectively applied through a switch 12.

The manufacturing method of thus composed liquid crystal device 1 is as follows. For example, using the light permeable substrate 2 and a substrate undergoing horizontal orientation treatment, a solution mixing a liquid crystal of which dielectric anisotropy is positive and a polymerizing compound is injected in a non electric-field state to form a network, the substrate is peeled off and the liquid crystal is removed, so that only the network is left over on the light-transmissive substrate 2. On the light-transmissive substrate 3, too, only a network is formed same as on the light-transmissive substrate 2, and the pair of light permeable substrates 2, 3 are joined together by using the sealing member 8 so that the directions of their horizontal orientation may cross orthogonally with each other, and then a liquid crystal of which dielectric anisotropy is injected again to form the liquid crystal device 1.

Characteristically of this liquid crystal device 1, when a low voltage is applied, since the liquid crystal molecules are arranged irregularly by the defining force of the horizontal orientation, the light transitting, for example, the first liquid crystal layer 6 shows a wide scatter in the abnormal light beam direction (the longer axis direction of liquid crystal molecule), and is not scattered in the ordinary light beam direction (the shorter axis direction of liquid crystal molecule). However, by passing through the second liquid crystal layer 7, the ordinary light beam direction coincides with the abnormal light beam direction, and the light is scattered, and finally all light beam components are scattered. When a sufficiently high voltage is applied, the liquid crystal molecules in the first liquid crystal layer 6 and second liquid crystal layer 7 are all aligned in the direction of electric field, and the light is not scattered so that a transparent state is set up.

As compared with the conventional liquid crystal/high-molecular compound film, this liquid crystal device 1 is oriented and is hence excellent in response characteristics, and does not show hysteresis characteristics, and moreover by injecting liquid crystal of high purity after sufficiently washing only the polymer network preliminarily, a device of high resistance can be presented, and it is easy to apply to the active matrix liquid crystal panel.

Besides, when the liquid crystal device 1 is composed by injecting the liquid crystal with positive dielectric constant by adding dichroic pigment, the same characteristics as in the two-layer type Guest/Host (GH) mode are obtained, in principle. That is, the light absorption axes if the first liquid crystal layer 6 and second liquid crystal layer 7 are almost orthogonal to each other, and the natural light is efficiently absorbed when a low voltage is applied. On the other hand, when a sufficiently high voltage is applied, since the liquid crystal molecules are aligned in the direction of electric field, and the dichroic pigment is also oriented again in this direction, and absorption of light hardly occurs. Therefore, the contrast is high, and the problem of parallax experienced in the conventional two-layer type GH mode is solved.

It has been hitherto proposed to add pigments in the liquid crystal drops independent of the high molecular film (J. L. Fergason, SID Digest, 1985, p. 68). In this case, however, since the pigments are arranged irregularly in the liquid crystal drops, unabsorbed portions may occur in the incident light, whereas in the liquid crystal device 1 of the invention since the pigments are oriented and controlled so as to absorb all components of incident light, the contrast is also excellent, aside from the features above, as compared with the prior art.

Figure 2:
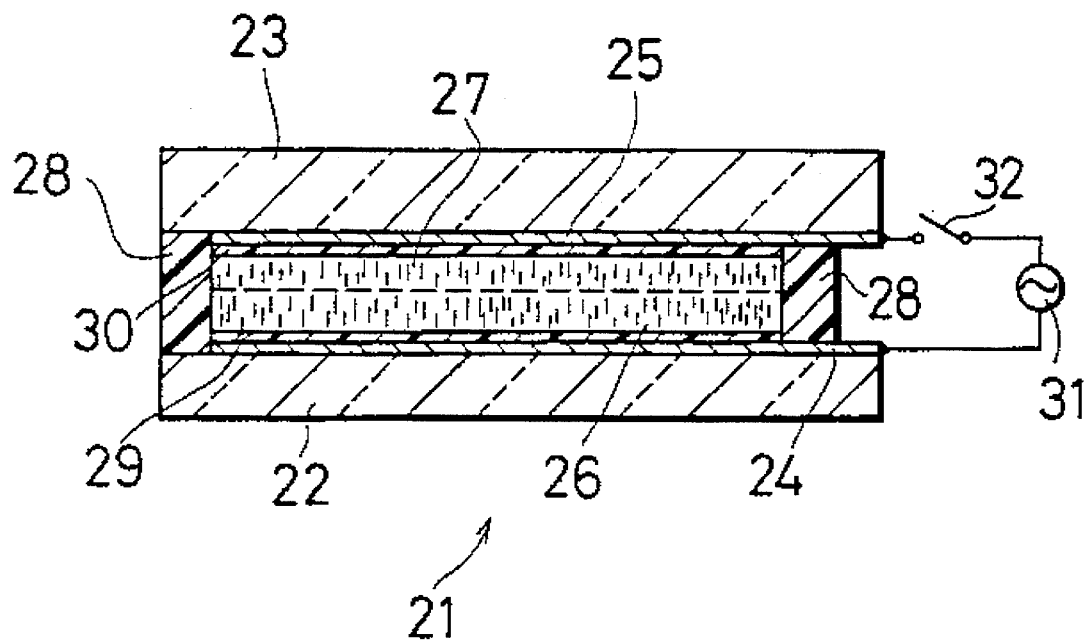
FIG. 2 is a sectional view showing the structure of a liquid crystal device 21 as other embodiment of the invention.

It is also possible to obtain characteristics reverse to the electro-optical characteristics above. FIG. 2 is a sectional view showing the structure of a liquid crystal device 21 which is another embodiment of the invention. The liquid crystal device 21 is composed by forming transparent electrodes 24, 25 respectively on confronting surfaces of pair of light transmittable substrates 22, 23, forming orientation films 29, 30 further thereon, and placing a first liquid crystal layer 26 and a second liquid crystal layer 27 containing dichroic pigments respectively in an enclosed space formed by such light transmittable substrates 22, 23 and sealing member 28. A voltage from a power source 31 is selectively applied to the transparent electrodes 24, 25 through a switch 32.

The manufacturing method of thus composed liquid crystal device 21 is as follows. That is, using the light transmittable substrate 22 and a substrate undergoing horizontal orientation, a solution mixing liquid crystal of which dielectric anisotropy is positive and a polymerizing compound is applied to form a network while applying a slightly high voltage. The voltage applied herein should be such that the liquid crystal may be slightly inclined in one directly at a certain angle (pretilt angle) to the vertical direction of the substrate (the pretilt angle can be controlled by voltage).

After forming the network, by peeling off the substrate and removing the liquid crystal, only the polymer network is formed on the light transmittable substrate 22. On the light transmittable substrate 23, too, only a polymer network is formed by the same processing as on the light transmittable substrate 22, and the both light transmittable substrates 22, 23 are glued together. Herein, a material adding liquid crystal of negative dielectric constant and dichroic pigment is injected and sealed. The light transmittable substrates 22, 23 should be glued together so that the projection directions on the substrates forming the polymer networks of liquid crystal molecules possessing the pretilt angles may be almost orthogonal to each other.

In the operation of the liquid crystal device 21, in non electric-field state, pigment molecules are oriented almost vertically to the substrates 22, 23, and no color is formed, but when a sufficiently high voltage is applied, the liquid crystal molecules vary the orientation so as to be nearly parallel to the substrates 22, 23 and orthogonal to the first liquid crystal layer 26 and second liquid crystal layer 27. The pigment components are re-oriented so as to be aligned in the orientation direction of the liquid crystal molecules, so that color is formed. As a result, the contrast is high, and the action is reverse to the display mode above.

As the method for defining the pretilt angle slightly inclined than the vertical direction of the substrates 22, 23, aside from the method of using together with the electric field, the horizontal orientation and vertical orientation of substrates 22, 23 may be combined, for example, the liquid crystal molecules may be pretreated to have a pretilt angle by vertical orientation processing of silane coupling agent or polyimide film after oblique evaporation in 85 degrees.

The liquid crystal devices 1, 21 are free from hysteresis characteristics which mattered in the conventional liquid crystal/high-molecular compound film, and are also high in contrast, bright because polarizer plate is not needed, possess high speed response characteristics which are features of the compound film, and heightened in resistance of the liquid crystal device, and possess many other features.

In particular, when using a liquid crystal material adding pigments, in the conventional compound film, the pigments were also taken into the polymer and the contrast could not be improved, but in the liquid crystal device of the invention, since the polymer and liquid crystal device can be completely separated, and such problems will not occur. Further, needless to say, it is possible to apply a polarizing plate to the device structure of the present liquid crystal device in accordance with the display mode.

Therefore, the liquid crystal device of the invention may be widely applied, not only in the display device of transmission type, reflection type or projection type, but also in applied producing requiring optical shutter function or filter function, for example, image pickup device, copier, and printing plate process machine. Practical examples are described below in further detail.

EXAMPLE 1

As the solution for use in manufacture of the liquid crystal devices 1, 21, diacrylate oligomer and photo polymerization initiator were dissolved in cyano biphenyl nematic liquid crystal (tradename E7 of BDH), and a solution with mean liquid crystal concentration of 95 wt. % was prepared.

By oblique evaporation method, between a glass substrate with a transparent electrode horizontally oriented so that the pretilt angle of the nematic liquid crystal may be 0 degree and a polycarbonate substrate, a liquid crystal is held so that the orientation may be parallel, and the thickness is controlled to 9 μm by a spacer. Afterwards, by UV irradiation, the oligomer in the solution is transformed into high polymer, and the polycarbonate is peeled off.

Another glass substrate with transparent electrode forming the polymer network in the same manner as in the method is prepared, and liquid crystal is contained in the substrate, and the two are glued together so that the substrate and the liquid crystal molecule major axis may be almost orthogonal to each other. A liquid crystal device as shown in FIG. 1 is (was) thus produced.

When a voltage was applied to this liquid crystal molecule, the transmissivity was lowered at about 5 V, and a strong scattering characteristic was obtained, and the responses speed was about 5 ms.

EXAMPLE 2

As the solution for use in manufacture of liquid crystal device, diacrylate oligomer and photo polymerization initiator were dissolved in cyano biphenyl nematic liquid crystal (tradename E7 of BDH), and a uniform solution with liquid crystal concentration of 95 wt. % was prepared.

The surface of the polyimide film was treated by rubbing, and between a glass substrate with transparent electrode horizontally oriented so that the pretilt angle of nematic liquid crystal may be almost 2 degrees and a polycarbonate substrate, a liquid crystal is held so that the orientation may be parallel, and the thickness is controlled to, for example, 9 μm by a spacer.

By UV irradiation, consequently, the oligomer was transformed into high polymer, and the polycarbonate substrate was peeled off, and the liquid crystal was sufficiently dissolved in organic solvent and removed, and dried.

In succession, another glass substrate with transparent electrode forming polymer network manufactured in the same procedure was prepared, and the two were glued so that the glass substrate and its molecular major axis direction may be almost orthogonal to each other.

Afterwards, the black guest-host liquid crystal (tradename ZLI-2274 of Merck) was injected between the substrates and sealed. A liquid crystal device as shown in FIG. 1 was thus produced.

When a voltage was applied/removed to and from the liquid crystal device in back light, a white/black display of wide viewing angle, excellent contrast (nearly 10), and high speed responses of about 3 ms was obtained.

EXAMPLE 3

As the solution for use in manufacture of liquid crystal device, diacrylate oligomer and photo polymerization initiator were dissolved in cyano biphenyl nematic liquid crystal (tradename E7 of BDH), and a uniform solution with liquid crystal concentration of 95 wt. % was prepared.

The surface of the polyimide film was treated by rubbing, and between a glass substrate with transparent electrode horizontally oriented so that the pretilt angle of nematic liquid crystal may be almost 2 degrees and a polycarbonate substrate, a liquid crystal is held so that the orientation may be parallel, and the thickness is controlled to, for example, 9 μm by a spacer.

By UV irradiation while applying an AC voltage of 30 V to the liquid crystal cell in this composition, the oligomer in the solution was transformed into high polymer, and the polycarbonate substrate was peeled off, and the liquid crystal was sufficiently dissolved in organic solvent and removed, and dried.

In succession, another glass substrate with transparent electrode forming polymer network manufactured in the same procedure was prepared, and it was glued with the substrate, and a liquid crystal panel was prepared.

Afterwards, the black guest-host liquid crystal (tradename ZLI-3200 of Merck) was injected between the substrates and sealed.

The liquid crystal materials used in the embodiments are materials of which dielectric anisotropy is negative, and when an AC voltage is applied, liquid crystal components parallel to the substrate are produced, and the liquid crystal molecules in the network formed on a pair of upper and lower substrates are glued so as to cross orthogonally in the AC voltage applied state. A liquid crystal device shown in FIG. 2 was thus produced.

By applying/removing AC voltage at 1 kHz under back light to and from the liquid crystal device in such constitution, a reverse display of Example 2, that is, a black/white display was obtained at wide viewing angle, high contrast (about 8) and high speed response (about 4 ms).

EXAMPLE 4

In the liquid crystal devices in Examples 1 to 3, when the gluing angle of a pair of glass substrates was varied, the contrast changed by 30% in an angle range of 90±30 degrees, but it was confirmed to be free from problem visually in display.

In the foregoing embodiments, especially in FIG. 1 and FIG. 2, the first layer and second layer are adjacent to each other in structure, but it has been confirmed that the effect is not changed practically if another liquid crystal layer (third layer) is placed between the first layer and second layer nearly in a same thickness.

As the liquid crystal material, aside from those shown in the embodiments, for example, a two-frequency driving liquid crystal ($\Delta\epsilon<0$, at high frequency voltage, $\Delta\epsilon>0$, at low frequency voltage) may be also used.

EXAMPLE 5

According to the manufacturing method of Example 2, three sets of liquid crystal panel before injection of liquid crystal were prepared. In these three liquid crystal panels, materials adding 2 wt. % each of guest dyes G209, G232 of Nippon Kanko Shikiso and D35 of BDH to the host liquid crystal ZLI-1840 of Merck were injected as liquid crystal and sealed.

These three panels were stacked to form a color liquid crystal filter, and a voltage was applied/removed to and from the liquid crystal panels, and a color display was confirmed by subtractive mixture under transmitted light of white light source.

Meanwhile, by using a material series presenting red, green and blue colors, or other material series presenting cyan, magenta and yellow, it has been confirmed that plural colors may be similarly obtained by the voltage application method in the liquid crystal panel (the voltage value and the method of selection of panels for applying voltage).

EXAMPLE 6

As one glass substrate with transparent electrode in Example 2, an active substrate possessing 100×128 pixels forming a matrix array by a thin film transistor using a-Si was used.

The structure of the thin film transistor was of reverse stagger type, the gate electrode was Ta (film thickness 1500 Å), the gate oxide film (film thickness 2000 Å) was a two-layer insulation film of $Ta_2O_5$ and $SiN_x$, the source electrode and drain electrode (individually film thickness 1500 Å) were Mo, and the pixels were ITO (film thickness 1500 Å).

By multiplex driving of liquid crystal panel in such structure under back light, a preferred monochromatic moving image could be displayed.

In this structure, furthermore, as the counter substrate of the active substrate, a glass substrate with transparent electrode forming micro color filters of red, green and blue was used, and a preferred color moving image of a wide viewing angle was confirmed.

Incidentally, the active substrate is not limited to this embodiment, and, for example, transistor elements using other materials such as p-Si and CdSe and two-terminal type elements such as MIM (Metal-Insulator-Metal) and diode may be used, and moreover the gate electrode may be made of a substrate forming an optical switching element composed of linear light emitting source and photosensitive material. It is also possible to display, needless to say, by simple matrix driving by using a matrix substrate not forming active element.

EXAMPLE 7

Figure 3:
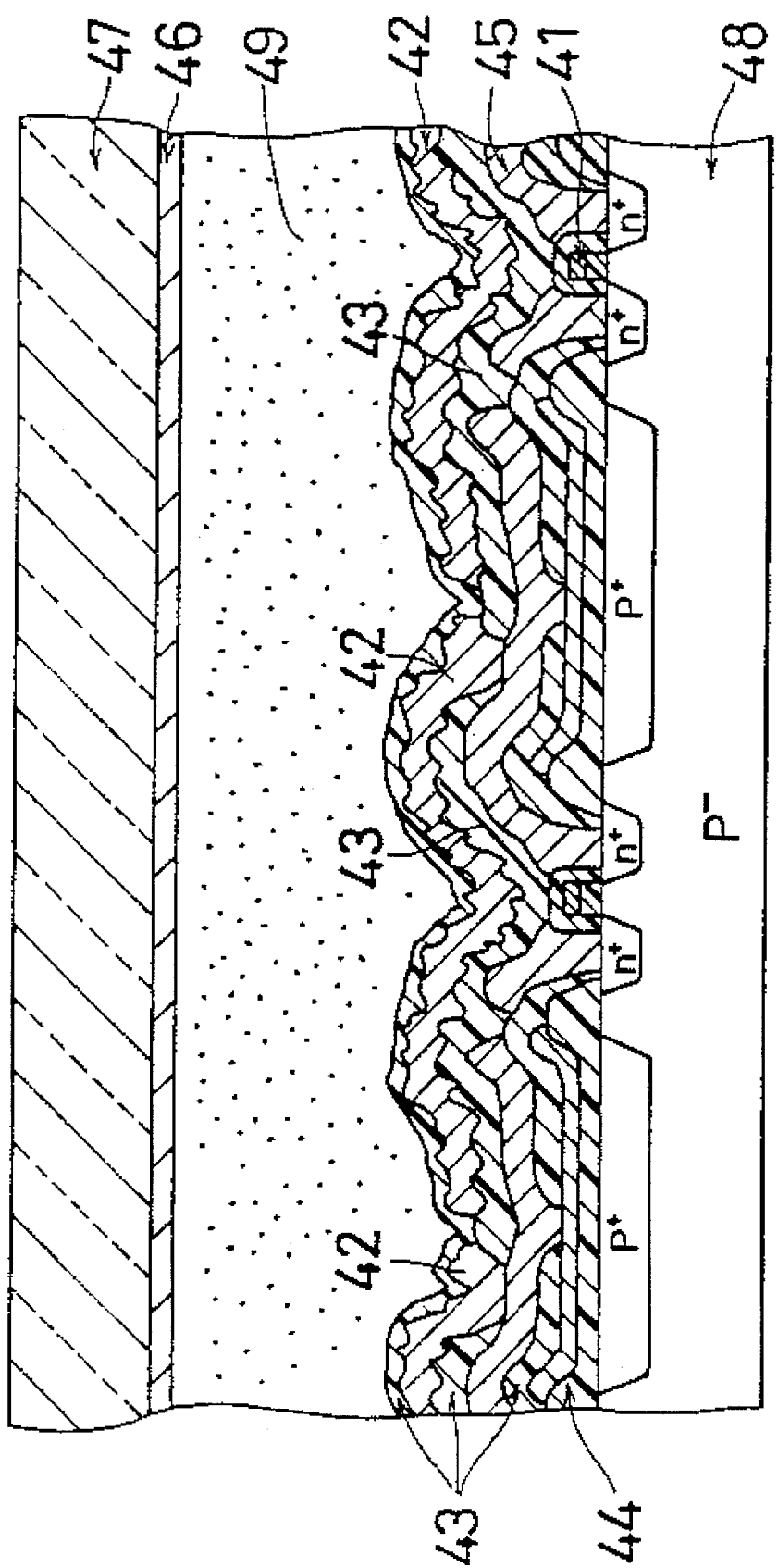
FIG. 3 is a sectional view showing the structure of a silicon monocrystal substrate as an active substrate for composing a liquid crystal display device in an embodiment of the invention.

FIG. 3 is a sectional view showing a structural example in the case of using a silicon monocrystal substrate as active substrate in the structure of Example 6. As the fabrication process, the MOS semiconductor process technology is applied, and the number of pixels is 240×380.

In the period from writing of video signal till writing of next video signal, as the means for assisting holding of the electric charge injected in the pixels, a storage capacitor is formed between silicon substrate 48 and p-Si layer 41 through an insulating film. A pixel electrode 42 which is also a reflector film is made of aluminum (Al), and its undulations are realized by applying a resist on an insulating film (SiN$_x$) 43 beneath the aluminum, and roughing the surface by photolithography. On the substrate, a field oxide film 44, a source line 45, and a common electrode 46 are formed, and a liquid crystal/high molecular compound film 49 (a composite film consisting of layers similar to the layers 6 and 7), ITO 46, and a glass substrate 47 conforming to the invention are further stacked thereon. In the drawing, the orientation film is omitted.

In such structure as shown in FIG. 3, by multiplex driving, a favorable monochromatic moving picture of wide viewing angle was displayed. Likewise, in the structure shown in FIG. 3, when the glass substrate 47 was replaced by a glass substrate adding micro color filters of red, green and blue composed of gelatin, a favorable color moving image of wide viewing angle was obtained.

EXAMPLE 8

Figure 4:
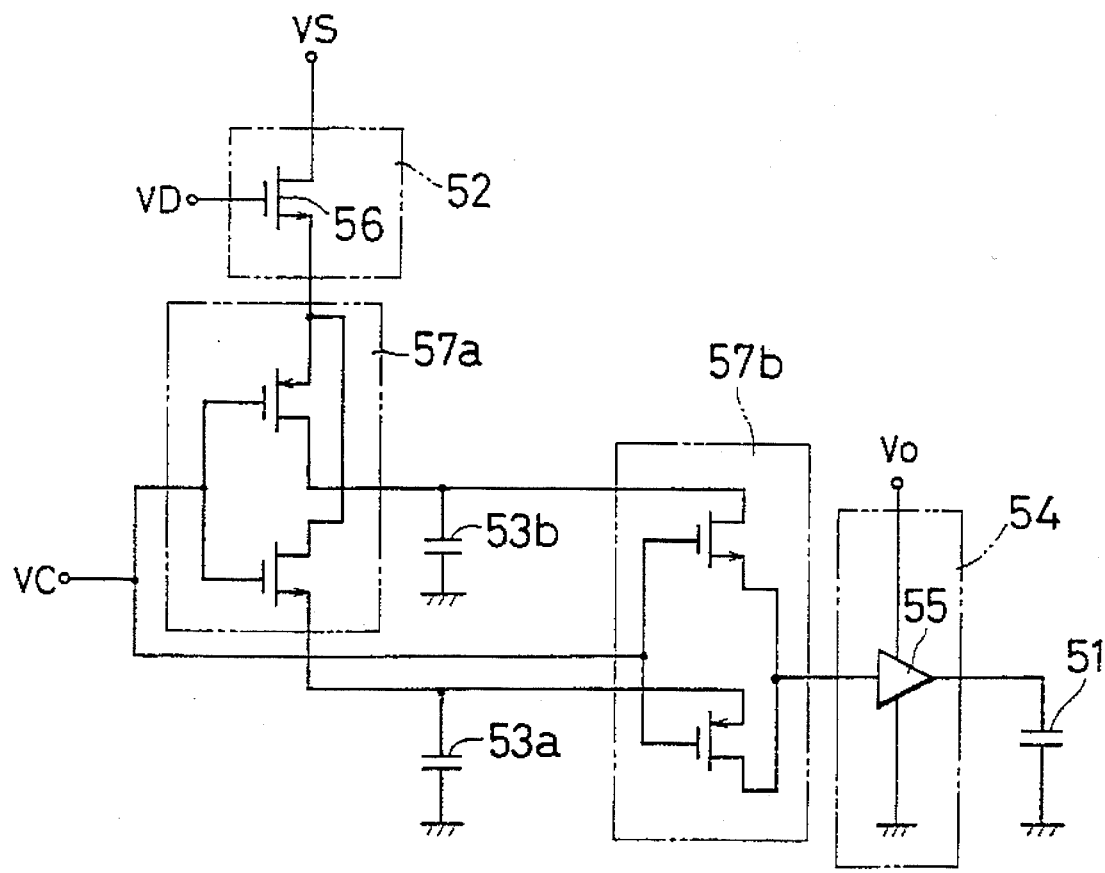
FIG. 4 is a circuit diagram showing a driving circuit of a liquid crystal display device.

In the structure in FIG. 3, a CMOS structure was realized by controlling P channel and N channel so as to form a circuit equivalent to the circuit shown in FIG. 4 further on the Si monocrystal substrate.

FIG. 4 shows a driving circuit for driving a pixel 51, being composed of a signal scanning part 52, signal holding capacitors 53a, 53b, pixel driving part 54, first switching circuit 57a for changing over and applying the driving signal from the signal scanning part 52 to either one of the signal holding capacitors 53a, 53b, and a second switching circuit 57b for changing over and applying either one of the driving signals held in the signal holding capacitors 53a, 53b to the pixel driving part 54. The signal scanning part 52 is composed of N channel MOS transistor 56, a scanning signal VD is applied to the gate, a driving signal VS is applied to the source, and the drain is connected to the first switching circuit 37a. The pixel driving part 54 is composed of buffer circuit 55, and a liquid crystal driving voltage Vo is supplied to the buffer circuit 55, and its output voltage is applied to the pixel 51.

Figure 5:
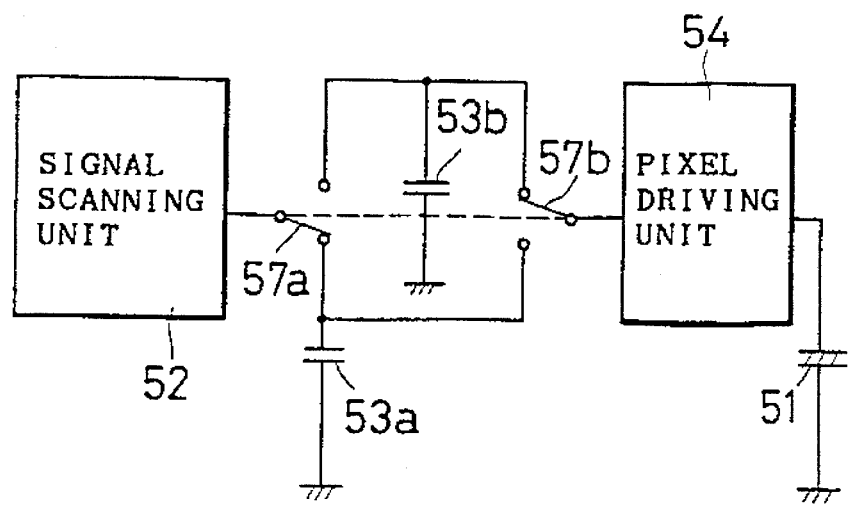
FIG. 5 is a block diagram showing the function of the driving circuit shown in FIG. 4.

The first and second switching circuits 57a, 57b are both composed of a set of N channel MOS transistor and P channel MOS transistor, and a common changeover signal VC is applied to each gate. Therefore, when either one transistor is on, the other transistor is off. FIG. 5 is a block diagram showing the function of the circuit shown in FIG. 4.

In the driving circuit shown in FIG. 4 and FIG. 5, by applying a signal of high level or low level as changeover signal VC, the pixel 51 can be driven by the driving signal accumulated in the signal holding capacitor 53a or 53b. Therefore, while displaying the pixels, it is also possible to accumulate the driving signal to be displayed next, and hence one screen can be displayed simultaneously and sequentially. When actually displayed according to this principle, a favorable monochromatic moving image could be confirmed at this viewing angle.

EXAMPLE 9

Figure 6:
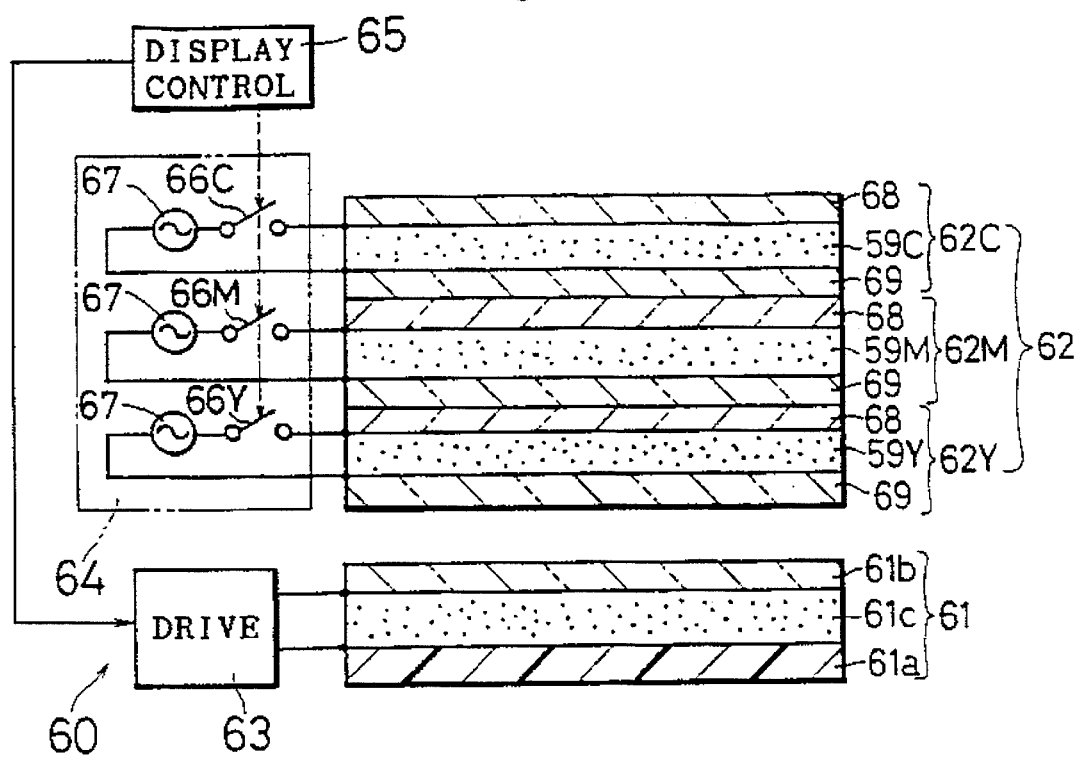
FIG. 6 is a schematic diagram showing the structure of a display device 60 using the liquid crystal display device of the invention.

FIG. 6 is a diagram showing the structure of a display device 60 using the liquid crystal device conforming to the invention. The display device 60 comprises a liquid crystal display device 61 conforming to Example 8, a color modulation filter (or a color liquid crystal filter) 62 which is a liquid crystal device conforming to Example 5, a driving circuit 63 for driving the liquid crystal display device 61, filter driving means 64 for driving the color modulation filter 62, and a display control circuit 65 for controlling the driving circuit 63 and filter driving circuit 64 for presenting a desired display in a desired color in the liquid crystal display device 61.

The liquid crystal display device 61 is an active matrix type liquid crystal display device, and is composed of confronting light transmittable substrate 61b and substrate 61a provided with light reflection means for reflecting the incident light from the light transmittable substrate 61b, with the liquid crystal/high-molecular compound film 61c interposed between the light transmittable substrate 61b and the counter substrate 61a. A common electrode is formed nearly on the entire surface of the surface of the light transmittable substrate 61b confronting the counter substrate 61a, and plural display electrodes are formed in matrix on the surface of the counter electrode 61a confronting the light permeable substrate 61b, and the electrode overlaying regions are display regions (pixels). In the liquid crystal display device 61, a driving voltage from the driving circuit 63 is applied between the common electrode and display electrodes, so that specified display is presented. The driving circuit 63 is controlled by a display control signal from the display control circuit 65.

The color modulation filter 62 consists of cyan filter 62C, magenta filter 62M, and yellow filter 62Y stacked in this sequence, and is disposed at the light transmittable substrate 61b side of the liquid crystal display device 61. The cyan filter 62C forms transparent electrodes not shown herein over the entire confronting surfaces of a pair of light transmittable substrates 68, 69, and is composed through the liquid crystal/high-molecular compound film 59C containing dichroic pigments of cyan between the substrates 68 and 69 as mentioned above. The magenta filter 62M forms transparent electrodes not shown herein over the entire confronting surfaces of a pair of light transmittable substrates 68, 69, and is composed through the liquid crystal/ high-molecular compound film 59M containing dichroic pigments of magenta between the substrates 68 and 69 as mentioned above. The yellow filter 62Y forms transparent electrodes not shown herein over the entire confronting surfaces of a pair of light transmittable substrates 68, 69, and is composed through the liquid crystal/high molecular compound film 59Y containing dichroic pigments of yellow between the substrates 68 and 69 as mentioned above.

The cyan filter 62C, magenta filter 62M, and yellow filter 62Y are supplied with AC voltage from an AC power source 67 through switching circuits 66C, 66M, 66Y respectively. The switching circuits 66C, 66M, 66Y selectively applies AC voltage to the cyan filter 62C, magenta filter 62M, and yellow filter 62Y according to the changeover signal from the display control circuit 65, and drives each filter. By such on/off control of the filters, three primaries, red light, green light, and blue light can be entered in the liquid crystal display device 61. Table 1 shows the corresponding relation of the driving state of each filter and color of incident light.

TABLE 1

| Driving state | | | Color of |
|---|---|---|---|
| 62C | 62M | 62Y | incident light |
| ON | OFF | OFF | Red |
| OFF | ON | OFF | Green |
| OFF | OFF | ON | Blue |

In the display device 60 in such constitution, the cyan filter 62C, magenta filter 62M, and yellow filter 62Y are selectively operated, and the red light, green light, and blue light are entered into the liquid crystal display device 61 of reflection type in each unit time. In synchronism, by sequentially displaying the image for red color, image for green color, and image for blue color in the liquid crystal display device 61, a favorable color moving image can be obtained in at a high viewing angle.

EXAMPLE 10

This is a case of applying the liquid crystal device conforming to the foregoing embodiments in a transmission type optical device.

Figure 7:
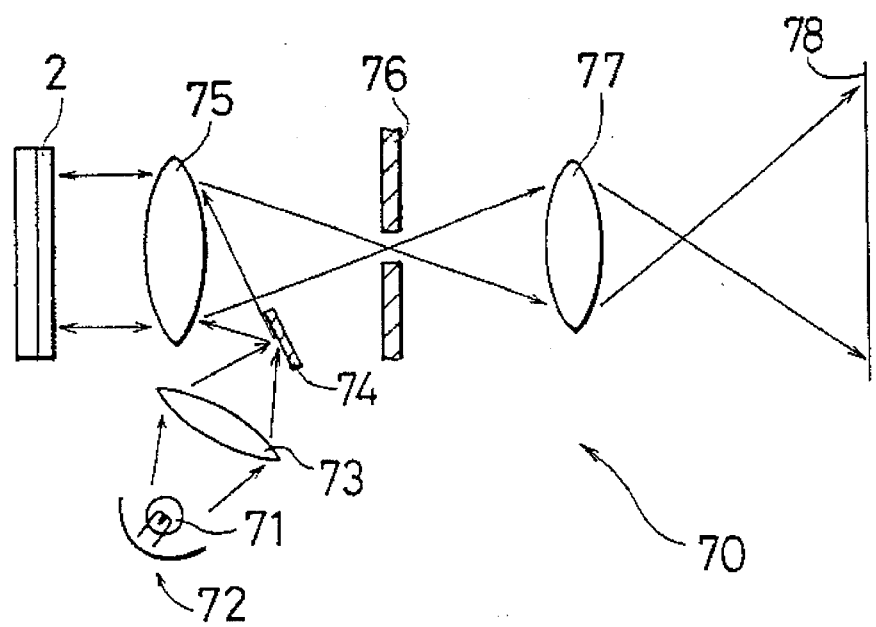
FIG. 7 is a schematic diagram showing the structure of an optical device 70 using the liquid crystal display device of the invention.

FIG. 7 is a diagram showing the structure of an optical device 70 using the liquid crystal device 2 of Example 1. The exit light from a lamp 71 and the reflected light from a mirror 72 are focused by a lens 73, and reflected by a mirror 74, and entered in a lens 75 to be parallel light, which enters the liquid crystal display device 2. In the liquid crystal display device 2, the image to be displayed is shown, and only the reflected light necessary for display out of the incident light is emitted, and given to a lens 77 through the lens 75 and slit 76, and magnified and displayed on a screen 78.

Figure 8:
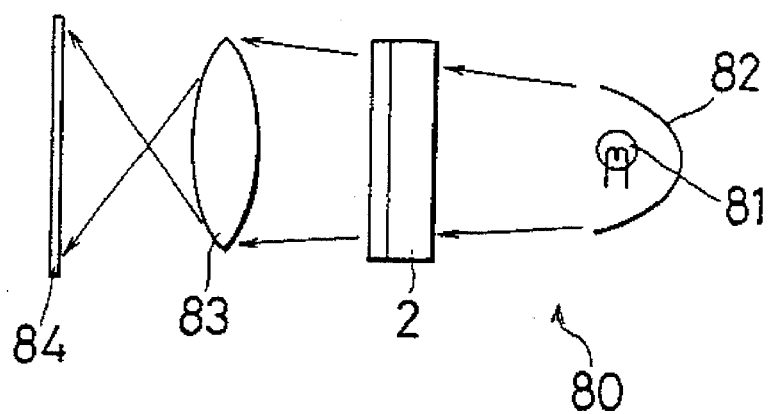
FIG. 8 is a schematic diagram showing the structure of an optical device 80 using the liquid crystal display device of the invention.

FIG. 8 is a diagram showing the constitution of an optical device 80 using the liquid crystal device 2 conforming to Example 5. The exit light from a lamp 81 and the reflected light from a mirror 82 are entered from the back side of the liquid crystal display device 2. The image to be displayed is shown in the liquid crystal display device 2, and only the light necessary for display out of the incident light is transmitted, and is magnified by a lens 83 and displayed on a screen 84.

Figure 9:
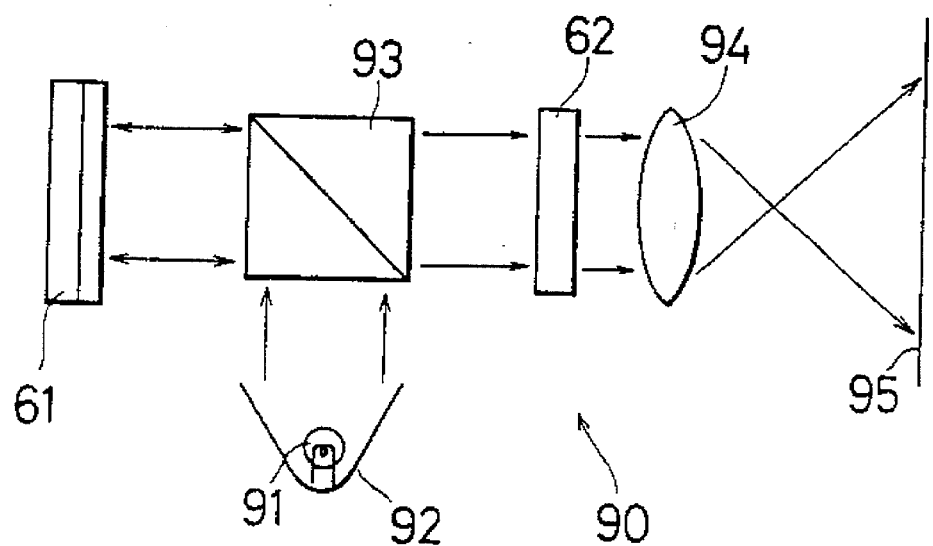
FIG. 9 is a schematic diagram showing the structure of an optical device 90 using the liquid crystal display device of the invention.

FIG. 9 is a diagram showing the constitution of an optical device 90 using the liquid crystal display device 61 and color modulation filter (the color liquid crystal filter) 62 conforming to Example 9. The exit light from a lamp 91 and the reflected light from a mirror 92 are entered in a prism beam splitter 93, and only the specified polarization portions are reflected and entered in the liquid crystal display device 61. In the liquid crystal display device 61, a voltage is applied to the pixel according to the display image, and only the light transmitted and reflected through the no-voltage portion passes through the prism beam splitter 93, and is selected in a desired color light by the photo modulation filter 62, and is magnified by a lens 94 and displayed on a screen 95. Herein, the cyan filter 62C, magenta filter 62M, and yellow filter 62Y are selectively operated, and red light, green light and blue light are transmitted in each unit time. In synchronism, by sequentially displaying image for red, image for green and image for blue in the liquid crystal display device 61, a color image is displayed.

Favorable projection images were also obtained in the optical devices 70, 80, 90 shown in FIGS. 7, 8 and 9, respectively.

EXAMPLE 11

Figure 10:
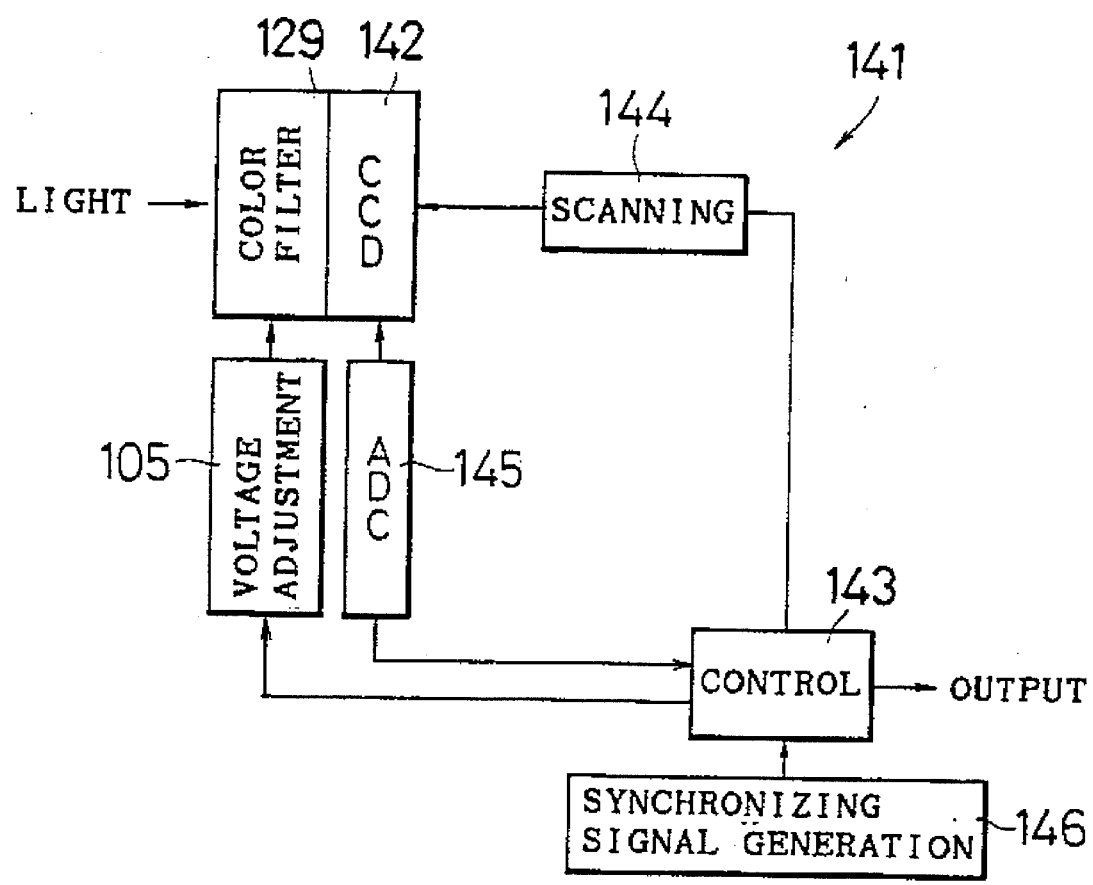
FIG. 10 is a block diagram of a color image pickup apparatus 141 as an electronic apparatus in an embodiment of the invention.

FIG. 10 is a block diagram of a color image pickup apparatus 141 which is an electronic apparatus using the liquid crystal device conforming to Example 5. The color image pickup apparatus 141 of this embodiment possesses a solid-state image pickup device 142 composed of CCD device and others, and a liquid crystal color filter 129 manufactured according to Example 5 is installed at the incident side of the light to the solid-state image pickup device 142.

A control circuit 143 controls a scanning circuit 144 to scan the rasters of the solid-state image pickup device 142. In every scanning of one screen of the solid-state image pickup device 142, a voltage adjusting circuit 105 is controlled, and a liquid crystal color filter 129 is controlled so as to transmit, for example, the light of red, green and blue sequentially. Therefore, from the solid stage image pickup device 142, the image signals corresponding to the red image, green image and blue image of the object of pickup are sequentially read out, and each image signal is converted into a digital signal by an analog/digital converter 145, and is read in the control circuit 143. The control circuit 143 is combined with a synchronizing signal generating circuit 146 for generating a synchronizing signal for synchronizing the control of the scanning circuit 144 and voltage adjusting circuit 105.

In the color image pickup device 141 of the embodiment, thus, the micro color filter at the incidence side of light required in the conventional solid-state image pickup element is not needed, and the resolution is substantially improved more than three times, and the image quality is enhanced. Besides, as compared with the case of using micro color filter, the manufacturing process and structure are simplified, and the yield is raised.

EXAMPLE 12

Figure 11:
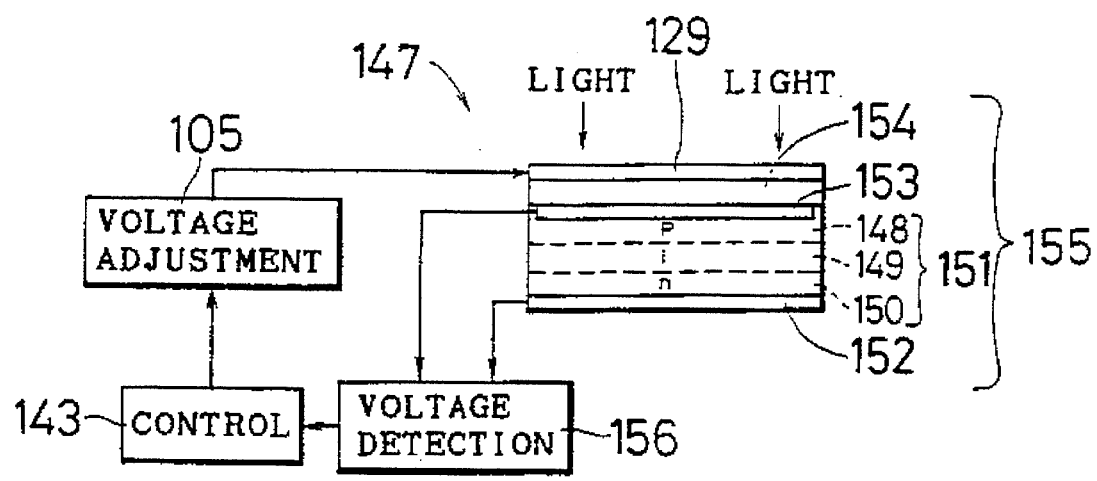
FIG. 11 is a block diagram of a color sensor 147 as other embodiment of the electronic device of the invention.

FIG. 11 is a block diagram of a color sensor 147 as other embodiment of an electronic apparatus. The color sensor 147 is used as the technique for reading the reference white document, for example, when adjusting white balance in a facsimile communication apparatus. The color sensor 147 comprises a photoelectric converting part 151 composed of p layer 148, i layer 149, and n layer 150 of amorphous silicon, a back electrode 152 formed in an n layer 150, a transparent electrode 153 composed of ITO (indium tin oxide) or the like formed in the p layer 148, and a sensor main body 155 containing a glass substrate 154.

At the light incident side of the sensor main body 155, the liquid crystal color filter 129 manufactured according to Example 5 is disposed. The control circuit 143 controls the voltage adjusting circuit 105, and controls so that the liquid crystal color filter 129 may transmit, for example, light of red, green and blue sequentially. At every change-over of color, a voltage detecting circuit 156 detects the voltage between the back electrode 152 and transparent electrode 153. That is, the transmitted light intensity of each color can be detected.

In such color sensor 147, hitherto, color filters of red, green and blue colors were disposed on the sensor main body 155, and the back electrode 152 and transparent electrode 153 were separated in every color filter. Comparing with such prior art, the constitution may be simplified and downsized in the embodiment.

EXAMPLE 13

Figure 12:
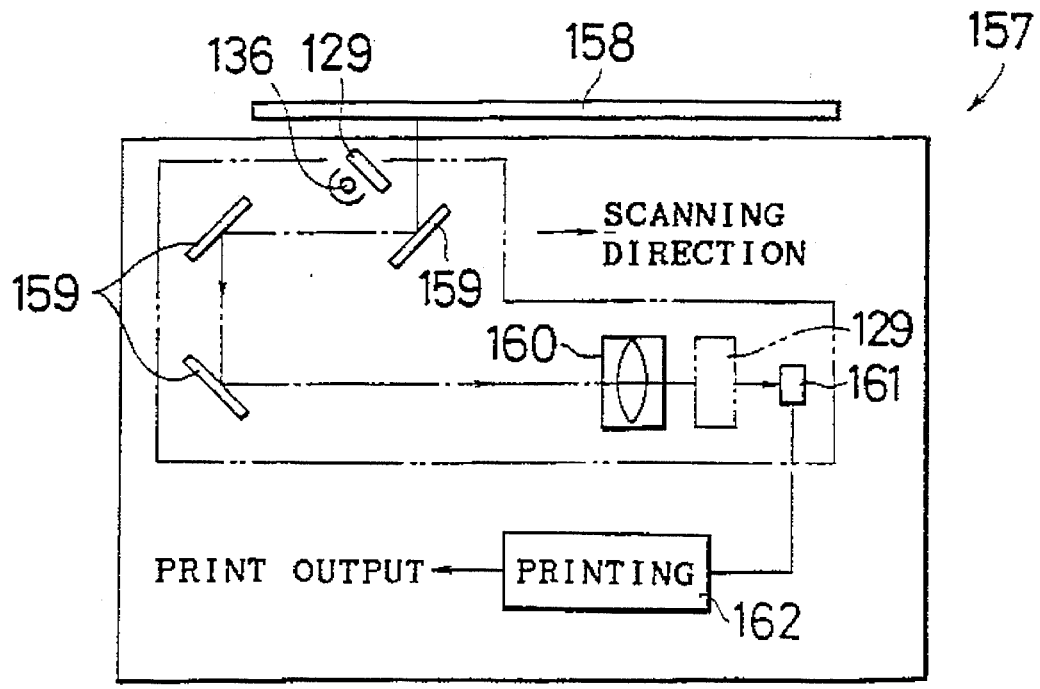
FIG. 12 is a block diagram of a color copier 157 in another embodiment of the electronic device of the invention.

FIG. 12 is a block diagram of a color copier 157 as another embodiment of electronic apparatus. The color copier 157 uses the light source 136 used when reading the original image by emitting light to an document 158 as the white light source, and disposes the liquid crystal color filter 129 manufactured according to Example 5 between the light source 136 and document 158. The reflected light from the document 158 enters an image sensor 161 such as CCD device through plural reflector mirrors 159 and optical device 160. That is, every time the liquid crystal color filter 129 is changed over to, for example, red, green and blue, the document 158 is scanned, and the image sensor 161 reads the document images corresponding to each color.

The output of the image sensor 161 is entered in a printing device 162, and the printing device 162 prints plural times on a single recording paper by using color developers of plural colors corresponding to the three colors, and a color copy is reproduced. The printing device 162 comprises a laser light generating device, a thermosensitive drum irradiated with laser light, and a developing device using the color developers.

Therefore, in such color copier 157, the mechanical structure for changing over the colors of light source to be emitted to the document 158 required in the prior art is no longer necessary, and the structure is simplified, and the durability is improved at the same time.

As other modification of this embodiment, instead of placing the liquid crystal color filter 129 near the light source 136, it may be disposed on the optical path of the previous stage of the image sensor 161 as indicated by double dot chain line in FIG. 12. In such constitution, too, the same effects as mentioned above may be achieved.

EXAMPLE 14

Figure 13:
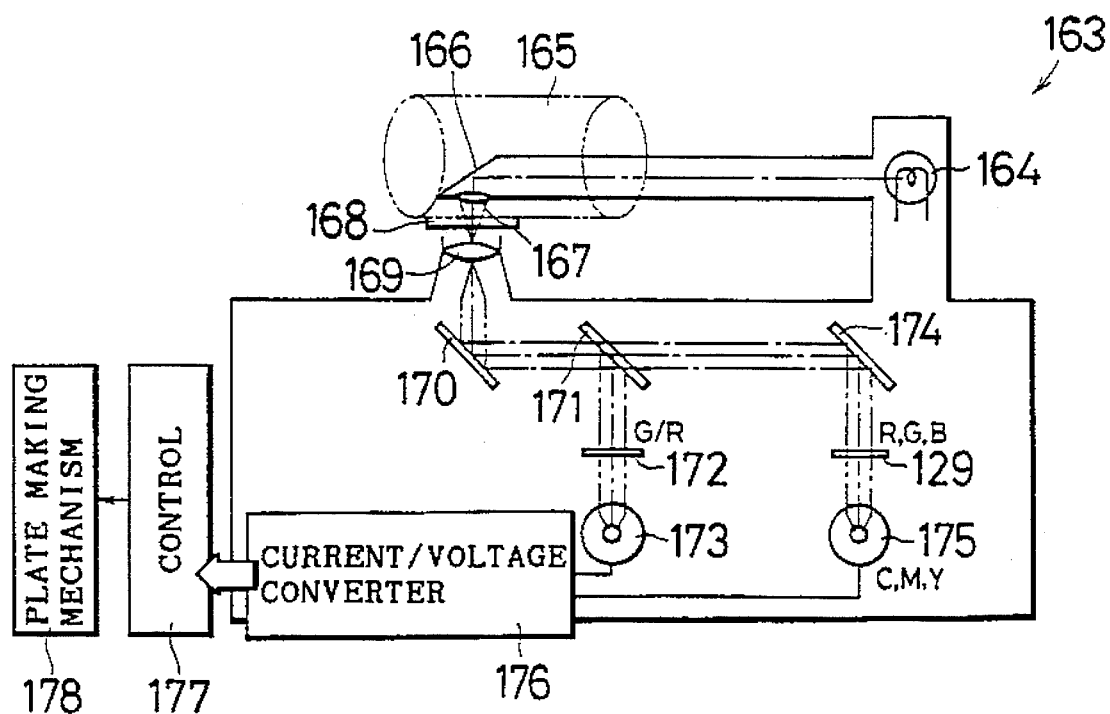
FIG. 13 is a schematic diagram of a color printing plate process machine 163 as a different embodiment of the electronic apparatus of the invention.

FIG. 13 is a system diagram of a color printing plate process machine 163 as other embodiment of electronic apparatus. The plate process machine 163 possesses a halogen lamp 164 as light source, and the light of the halogen lamp 164 is led into a document cylinder 165 made of glass or the like formed in a right cylindrical form, and focused on a color document film 168 mounted on the document cylinder 165 through reflector mirror 166 and focusing lens 167. The light passing through the color document film 168 is led into a half mirror 171 through pickup lens 169 and reflector mirror 170. The light reflected by the half mirror 171 entered a photo tube 173 through green or red filter 171.

On the other hand, the light passing through the half mirror 171 is reflected by a reflector mirror 174, and enters a phototube 175 by passing through the liquid crystal color filter 129 manufactured according to Example 5. The current corresponding to the quantity of incident light from the phototubes 173, 175 is converted into a voltage in a current/voltage converter 176, and is given to a control circuit 177, and the control circuit 177 controls a plate making mechanism 178, and a plate material for lithography, letterpress, copperplate, or screen plate is manufactured.

In such color plate process machine 163, too, it is not necessary to use filters of, for example, red, green and blue, and corresponding plural phototubes, and the constitution may be downsized and simplified.

EXAMPLE 15

Figure 14:
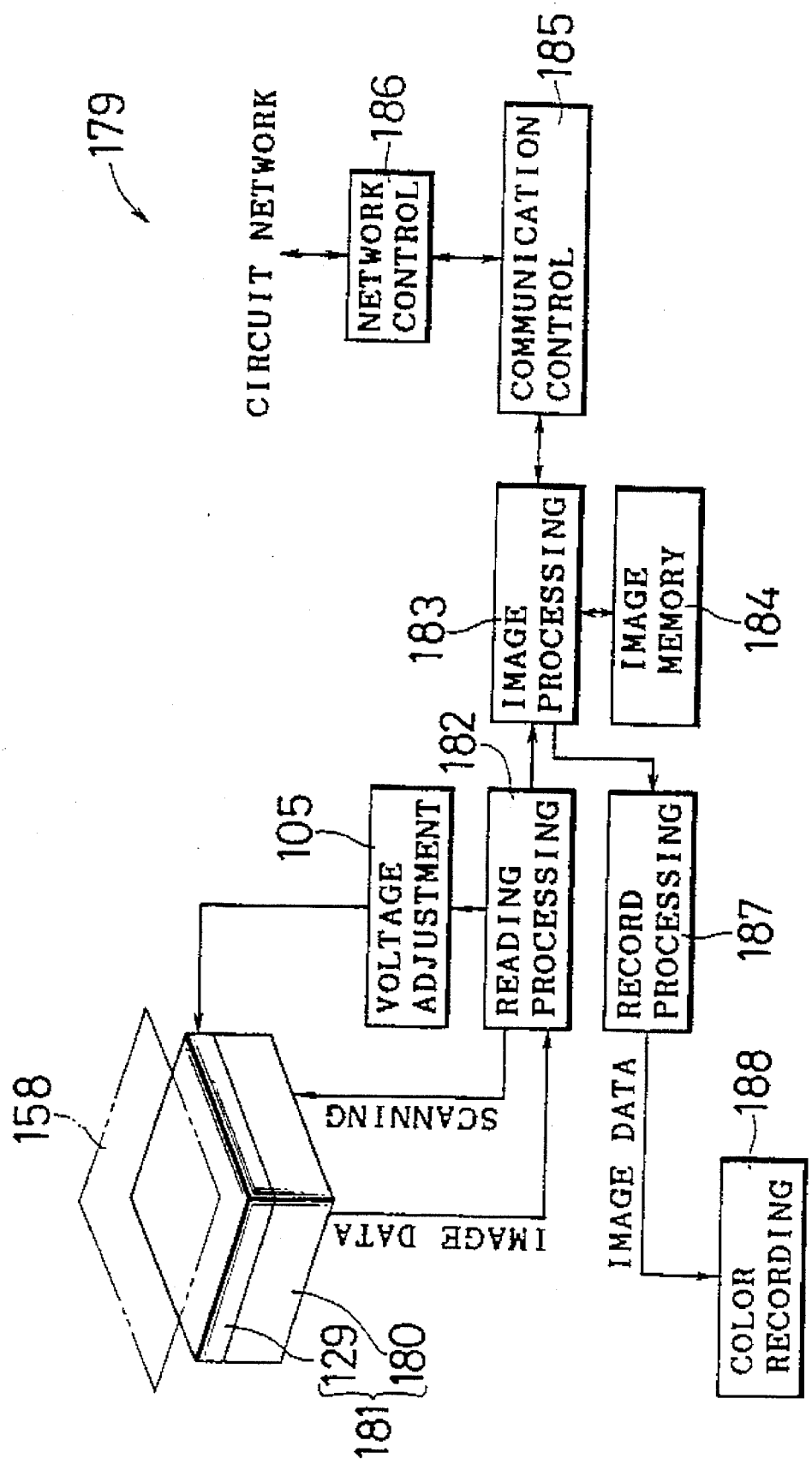
FIG. 14 is a block diagram of a color facsimile apparatus 179 as a further different embodiment of the electronic apparatus of the invention.

FIG. 14 is a block diagram of a color facsimile apparatus 179 for electrically transmitting a color image as other embodiment of electronic apparatus of the invention. The color document 158 to be read is read every time the liquid crystal color filter 129 is changed over to three colors, by a reading device 181 stacking up the liquid crystal color filter 129 manufactured according to Example 5 and a line image sensor 180. That is, a reading process circuit 182 controls the voltage adjusting circuit 105, and sequentially changes the color of the light passing through the liquid crystal color filter 129 in three colors, and the line image sensor 180 is scanned in synchronism. The obtained image data of each color is read by the reading process circuit 182, and the data is compressed or decompressed in an image processing circuit 183, or is stored in an image memory 184. The image data obtained after reading the color document 158 is sent out to a telephone circuit network through a network control unit 186 by calling the destination of communication through a communication control unit 185.

On the other hand, the image data sent out from the telephone circuit network runs through the network control unit 186 and communication control unit 185, and is compressed by decompression or the like in the image processing circuit 183, and through the recording processing circuit 187, a color image is recorded on a recording paper by color recording means 188 comprising thermal transfer ribbons of three colors or ink jet nozzles of three colors. The constitution of such color facsimile apparatus 179 is the so-called on-chip type having the liquid crystal color filter 129 mounted directly on the line image sensor 180.

In such color facsimile apparatus 179, hitherto, for example, micro color filters of three colors are mounted on the line image sensor 180. In this embodiment, therefore, the constitution may be downsized and simplified as compared with the prior art.

Figure 15:
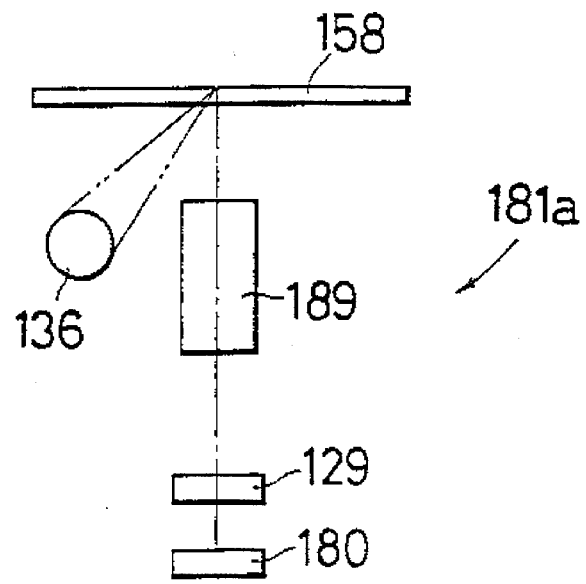
FIG. 15 is a schematic diagram showing a reading device 181a in other structural example of the color facsimile apparatus 179.

FIG. 15 is a system diagram showing a reading device 181a as other constitutional example of the color facsimile apparatus 179. In this embodiment, the color document 158 is illuminated with light from, for example, the white light source 136, and its reflected light enters the line image sensor 180 through a rod lens 189 and a liquid crystal color filter 129. In such embodiment, hitherto, instead of the liquid crystal color filter 129, three color filters were mechanically moved parallel, and the reflected light from the color document 158 was separated into three colors. In the embodiment, as compared with such prior art, the structure may be simplified and downsized.

Figure 16:
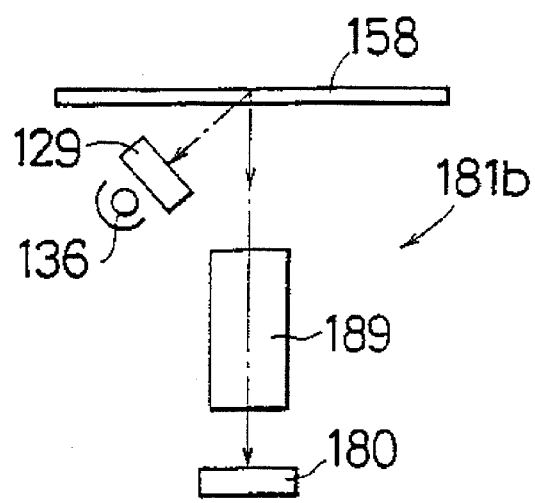
FIG. 16 is a schematic diagram showing a reading device 181b in a different structural example of the color facsimile apparatus 179.

FIG. 16 is a system diagram showing a reading device 181b as a different constituent example of the color facsimile apparatus 179. In the embodiment, the light from the white light source 136 is separated in time series into three colors through the liquid crystal color filter 129, and the reflected light from the color document 158 of the light source light is entered in the line image sensor 180 through the rod lens 189. In the embodiment, too, the same effects as in the foregoing embodiments may be achieved.

EXAMPLE 16

As an example showing applicability of the liquid crystal color filter 129 manufactured according to Example 5 in the image operation apparatus, the image operation system disclosed in the collected papers of the Japan Society of Electronic Information and Communication C-II J73-C-II, pp. 703-712, 1990, is cited and explained below.

Figure 17:
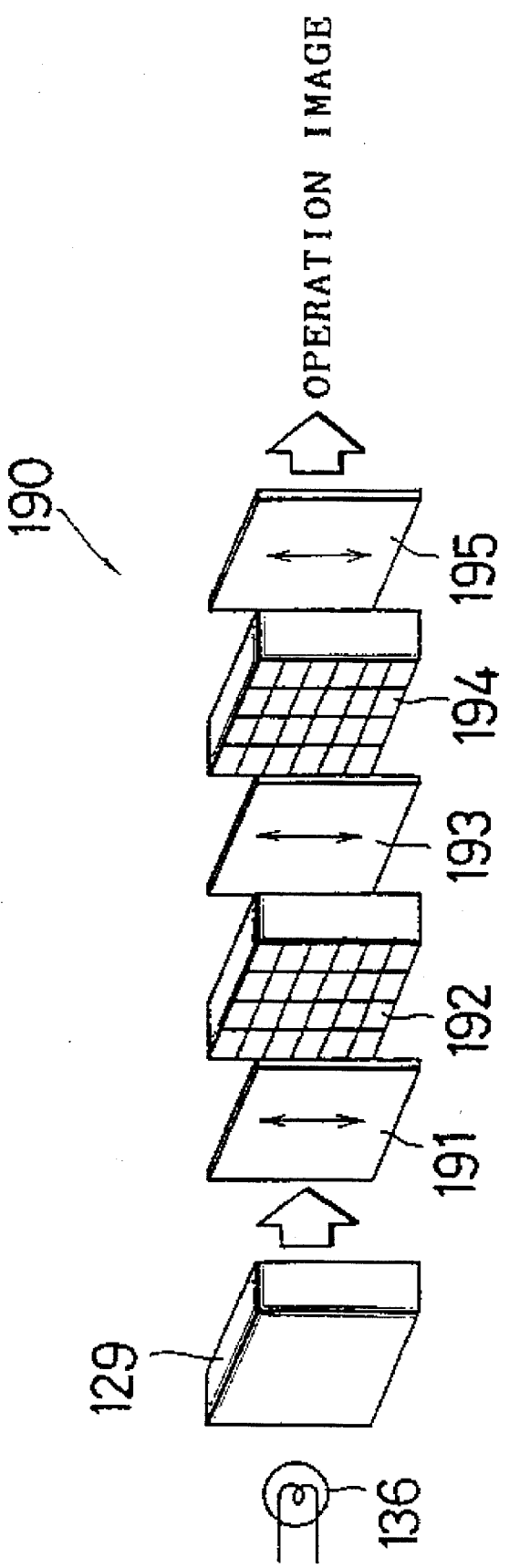
FIG. 17 is a schematic diagram showing the structure of an image operation apparatus 190 of the invention.

FIG. 17 is a system diagram showing the constitution of an image operation apparatus 190 of the invention. The image operation apparatus 190 comprises white light source 136 and liquid crystal color filter 129, and the light from the liquid crystal color filter 129 is entered into a structure consisting of a color polarizer 191, a liquid crystal display 192 for monochromatic display in, for example, active matrix type, a color polarizer 193, a similar liquid crystal display 194, and a color polarizer 195, while the light leaving the color polarizer 195 becomes the operation image. Herein, the color polarizers 191,193, 195 convert the light in a predetermined specific wavelength into linear polarized light, but the light in the wavelength other than the specific wavelength is not converted into linear polarized light, and passes directly.

Figure 18:
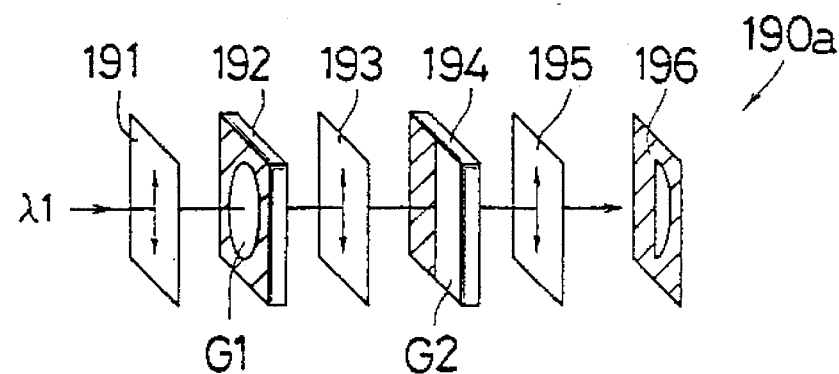
FIG. 18(1)(2)(3) is a diagram for explaining the action of the image operation apparatus 190.
Figure 18:
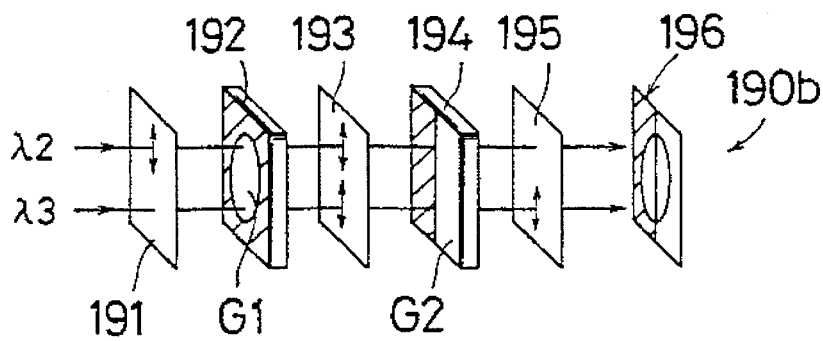
Figure 18:
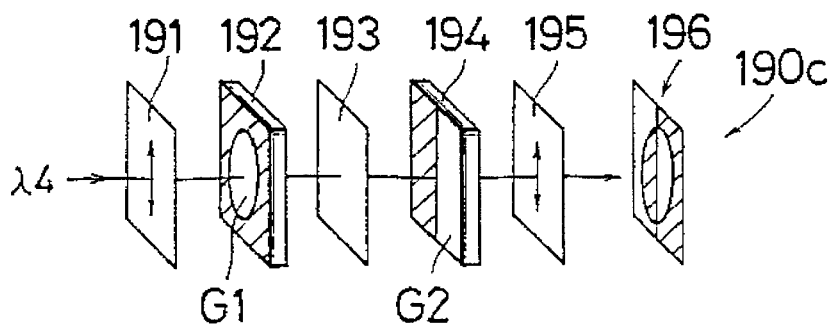
Figure 19B:
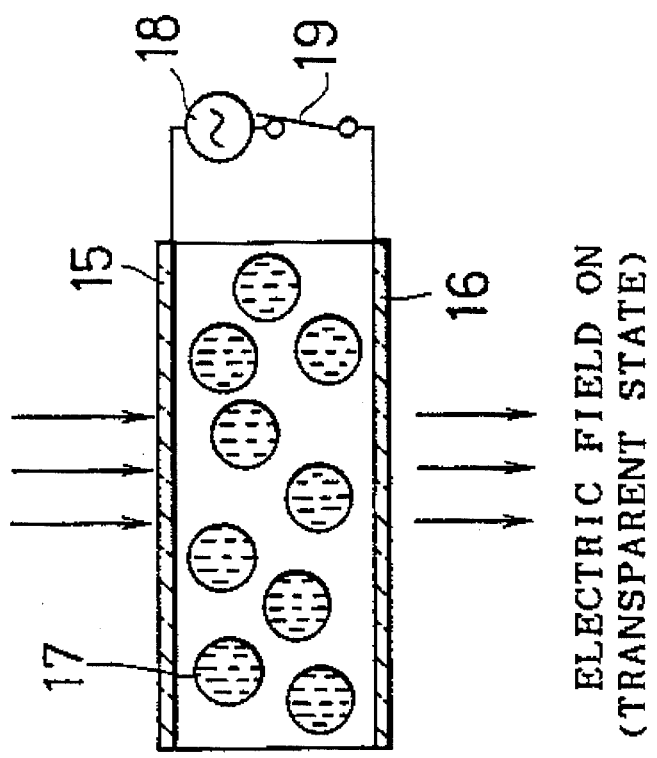
FIG. 19(a)(b) is a diagram showing the principle of operation using the liquid crystal device of conventional liquid crystal/high-molecular compound film.
Figure 19A:
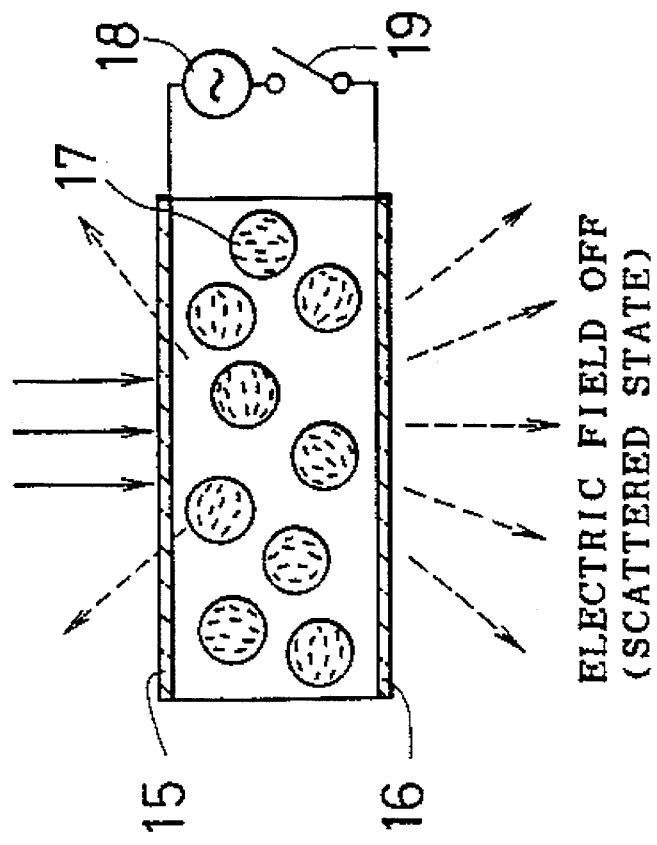

FIG. 18 is a diagram for explaining the operation of the image operation apparatus 190 disclosed in the paper. FIG. 18(1) shows an image operation apparatus 190a for operating the AND (G1×G2) of display images G1, G2 of the liquid crystal display devices 192, 194. In this example, the color polarizers 191, 193, 195 convert the light in the wavelength of $\lambda 1$ into linear polarized light all in the same direction. Therefore, the light of linear polarization passing through the color polarizer 191 is rotated, for example, by a specific angle in the non-transmission region indicated by shaded area of the liquid crystal display device 192, while passing as polarized light in the transmission region without shaded area.

Therefore, the light of the transmission region directly passes through the color polarizer 193, and next the portion corresponding to the shaded non-transmission region of the liquid crystal display device 194 is rotated, while passing directly in the transmission region without shaded area. When the transmitted light passes through the color polarizer 195, the light rotated by the liquid crystal display device 194 is cut off, and the light not rotated is allowed to pass. The light rotated by the liquid crystal display device 192 is cut off by the color polarizer 193. Therefore, as the operation image 196, a semicircular display portion is obtained.

FIG. 18(2) shows the constitution of the image operation apparatus 190b for realizing the OR (G1+G2) of the display images G1, G2 same as in FIG. 18(1). The light used herein is the light in two wavelengths $\lambda 2$, $\lambda 3$. Herein, the color polarizer 191 converts only the light in the wavelength $\lambda 2$ into linear polarized light, the color polarizer 193 converts the light in the wavelengths of both $\lambda 2$ and $\lambda 3$ directly into linear polarized light, and the color polarizer 195 converts the light in the wavelength of $\lambda 3$ only into linear polarized light.

Therefore, the light of the wavelength $\lambda 2$ passes through the color polarizer 191 to be converted into linear polarized light, and the light of wavelength $\lambda 3$ is not converted into linear polarized light and passes through the color polarizer 191 directly. When the light of wavelength $\lambda 2$ passes through the liquid crystal display device 192 and color polarizer 193, it passes only through the disk-shaped region without shaded area in the liquid crystal display device 192. When such light of wavelength $\lambda 2$ enters the liquid crystal display device 194, it passes, without being rotated, through the portion without shaded area, and is rotated in the shaded area and passes, but since the color polarizer 195 transmits all light of wavelength $\lambda 2$, the transmission light in the shape of the disk-shaped region is obtained.

On the other hand, when the light of wavelength $\lambda 3$ passes through the color polarizer 193, it is converted into linear polarized light for the first time, and therefore as it passes through the liquid crystal display device 194 and color polarizer 195, the light in the rectangular range without shaded area passes in the liquid crystal display device 194. Therefore, as the operation image 196, the superposed image of the circular image G1 and rectangular image G2, that is, the image of OR is obtained.

FIG. 18(3) shows the constitution of an image operation apparatus 190c for obtaining an inverted image of exclusive OR of images G1, G2 (G1EX0RG2) same as above. At this time, using a monochromatic color of wavelength $\lambda 4$, the color polarizers 191, 195 convert the wavelength $\lambda 4$ into linear polarized light, but the color polarizer 193 directly passes the light of wavelength $\lambda 4$. That is, the color polarizer 193 may not be necessarily disposed, or transparent glass or the like may be used. The light of wavelength $\lambda 4$ is converted into linear polarized light by passing through the color polarizer 191, and this light directly passes in the circular region without shaded area in the liquid crystal display device 192, and is rotated by a specific angle in the shaded area.

When the light in such state enters the liquid crystal display device 194, the light entering the shaded area of the liquid crystal display device 194 is rotated by a specific angle. That is, when passing through the liquid crystal display device 192, the rotated light is further rotated to be a linear polarized light parallel to the direction of polarization of the color polarizer 195. The range not rotated in the liquid crystal display device 192 is rotated in the shaded area in the liquid crystal display device 194, and is cut off by the color polarizer 195. In the passing portion not shaded in the liquid crystal display device 194, a similar phenomenon occurs, and therefore, the inverted image of the exclusive OR image of images G1, G2 is obtained as operation image 196 as shown in FIG. 18(3).

Such image operation apparatuses 190, 190a to 190c employ the liquid crystal color filter 129 manufactured according to Example 5, and therefore arbitrary wavelengths necessary for operation may be easily generated and selected, and it may be preferably applied in the uses for overlaying of plural images, deletion of a part from one image, and other image processing. Besides, the photo modulation device of the invention may be used as optical selector for picking up a desired frequency light signal from light signals at various frequencies coexisting in the optical communication apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal device, comprising:

exactly two substrates, having respective electrodes formed on confronting surfaces;

at least one orientation film formed on the electrodes means for applying voltage to the electrodes; and a plurality of liquid crystal layers interposed between the pair of substrates, wherein a respective liquid crystal layer is contained in a matrix or network polymer having an arbitrarily selected orientation, the liquid crystal molecules in the respective layer are aligned by said polymer with the liquid crystal molecules in at least one of the liquid crystal layers near the substrate having a tilt angle greater than 0° with respect to said substrate, and having been aligned by the orientation film, and the liquid crystal molecules intermediate said layers are present continuously in the matrix or network polymer over said layers.

2. The liquid crystal device according to claim 1, wherein the plurality of liquid crystal layers consist of two liquid crystal layers, and the directions of orientation of the liquid crystal molecules in the respective layers are mutually orthogonal when the liquid crystal molecules are made horizontally oriented.

3. The liquid crystal device according to claim 1, wherein the liquid crystal layers contain a liquid crystal compound, the dielectric constant of which is positive.

4. The liquid crystal device according to claim 1, wherein the liquid crystal layers contain a dichroic pigment.

5. The liquid crystal device according to claim 1, wherein the liquid crystal layers contain a liquid crystal compound, the dielectric constant of which is negative.

6. A display apparatus for displaying the light from one light source containing wavelengths of plural colors by irradiating to display means of transmission type or reflection type and photo modulation device, and the display means displays images corresponding to the plural colors sequentially within a period of after-image effect, and the photo modulation device changes the colors of the transmitted light in every display period of image of each color, wherein the photo modulation device comprising plural liquid crystal devices as claimed in claim 1 or claim 3 and changeover means for changing over the driving voltage applied to each liquid crystal device in plural different states, and changing over so that each liquid crystal device may transmitted light of mutually different wavelengths or transmitted light of an arbitrary wavelength.

7. A photo detector having an optical detecting means for producing a detection signal corresponding to the intensity of incident light and a photo modulation device disposed at the incident side of the optical detecting means, wherein the photo modulation device comprising plural liquid crystal devices as claimed in claim 1 or claim 3 and changeover means for changing over the driving voltage applied to each liquid crystal device in plural different states, and changing over so that each liquid crystal device may transmitted light of mutually different wavelengths or transmitted light of an arbitrary wavelength.

8. A color copier having one light source for generating light containing wavelengths of plural colors, a document, photoelectric converting means for forming optical image of the document and converting optical image into electric signal and a photo modulation device disposed either between one light source and the document or the document and the photoelectric converting means, and further comprising means for forming color image on a recording medium by using developers of plural colors on the basis of the electric signal obtained in the photoelectric converting means, wherein the photo modulation device comprising plural liquid crystal devices as claimed in claim 1 or claim 3 and changeover means for changing over the driving voltage applied to each liquid crystal device in plural different states, and changing over so that each liquid crystal device may transmitted light of mutually different wavelengths or transmitted light of an arbitrary wavelength.

9. A printing plate process machine having one light source for generating light containing wavelengths of plural colors, a document, photoelectric converting means for forming optical image of the document and converting optical image into electric signal and a photo modulation device disposed either between one light source and the document or the document and the photoelectric converting means, and further comprising plate material processing means for forming a document image of each color on plate materials of plural colors used as printing plates on the basis of the electric signal obtained from the photoelectric converting means, wherein the photo modulation device comprising plural liquid crystal devices as claimed in claim 1 or claim 3 and changeover means for changing over the driving voltage applied to each liquid crystal device in plural different states, and changing over so that each liquid crystal device may transmitted light of mutually different wavelengths or transmitted light of an arbitrary wavelength.

10. An image input/output apparatus for picking up the object in every one of plural colors by pickup means through a photo modulation device, storing the image data from the pickup means in the image memory in each color, and feeding color images, or displaying the image by display means on the basis of image data of each one of plural colors stored in the image memory, and changing over the colors of transmitted light by the photo modulation device, thereby producing a color image, wherein the photo modulation device comprising plural liquid crystal devices as claimed in claim 1 or claim 3 and changeover means for changing over the driving voltage applied to each liquid crystal device in plural different states, and changing over so that each liquid crystal devices may transmitted light of mutually different wavelengths or transmitted light of an arbitrary wavelength.

11. An image operation apparatus comprising:

a light source generating light of plural wavelengths, a photo modulation device for transmitting only the specific wavelength portion of the light from the light source, and plural display devices of transmission type or reflection type for transmitting or reflecting the light of one specific wavelength portion corresponding to the display image, and transmitting or reflecting the light of the remaining wavelength portions, wherein the photo modulation device comprising plural liquid crystal devices as claimed in claim 1 or claim 3 and changeover means for changing over the driving voltage applied to each liquid crystal device in plural different states, and changing over so that each liquid crystal device may transmitted light of mutually different wavelengths or transmitted light of an arbitrary wavelength.

12. A lighting apparatus for irradiating the light from a light source generating light containing wavelengths of plural colors as the light of one of plural colors through a photo modulation device, wherein the photo modulation device comprising
plural liquid crystal devices as claimed in claim 1 or claim 3 and
changeover means for changing over the driving voltage applied to each liquid crystal device in plural different states, and changing over so that each liquid crystal device may transmitted light of mutually different wavelengths or transmitted light of an arbitrary wavelength.

13. A method of making a liquid crystal device, comprising the steps of:

(a) providing a first pair of substrates disposed opposingly with a predetermined spacing, one of the substrates having electrodes and an orientation film formed on a surface thereof facing the other substrate, and the other substrate having an orientation film with optional electrodes formed on a surface thereof facing the one substrate;

(b) providing a second pair of substrates disposed opposingly with a predetermined spacing, one of the substrates having an orientation film with optional electrodes formed on a surface thereof facing the other substrate, and the other substrate having an orientation film with optional electrodes formed on a surface facing the one substrate;

(c) providing a third pair of substrates disposed opposingly with a predetermined spacing, one of the substrates having an orientation film with optional electrodes formed on a surface thereof facing the other substrate, and the other substrate having electrodes and an orientation film formed on a surface thereof facing the one substrate;

(d) placing a mixture of a liquid crystal compound and a polymerizable compound within respective predetermined spacings in each of the first, the second, and the third pair of substrates;

(e) polymerizing the polymerizable compound together with the liquid crystal compound under the influence of defining force exerted by the surface of any substrate that has been subject to an orientation processing and/or in the presence of application of external energy so that the molecules of the liquid crystal compounds so oriented cause the polymerization to form a matrix or network polymer having a selected orientation along the oriented liquid crystal molecules between the respective pairs of substrates;

(f) peeling off the other substrate, from the first pair of substrates, to leave the one substrate comprising a first matrix or network polymer formed thereon;

(g) peeling off both substrates, from the second pair of substrates, to leave only a second matrix or network polymer;

(h) peeling off the one substrate, from the third pair of substrates, to leave the other substrate, comprising a third matrix or network polymer formed thereon;

(i) removing the liquid crystal compound from the first, the second, and the third matrix or network polymers obtained in the steps of (f), (g) and (h), respectively and drying the respective matrix or network polymers, if desired;

(j) positioning the first matrix or network polymer having the substrate on which the electrodes and the orientation film are formed, the second matrix or network polymer, and the third matrix or network polymer having the substrate on which the electrodes and the orientation film are formed, in this order such that the electrodes, on the substrate of the first matrix or network polymer, oppose the electrodes on the substrate of the third matrix or network polymer through the second matrix or network polymer, and laminating the first, the second, and the third matrix or network polymers; and (k) adding a liquid crystal compound to the thus-laminated matrix or network polymer between said substrates.

14. The method according to claim 13, wherein in step (e) the molecules of the liquid crystal compound are oriented so as to form a predetermined tilt angle with respect to the substrate.

15. The method according to claim 13, wherein, in step (e), said external energy is derived from application of voltage and/or application of a magnetic field.

16. A method of making a liquid crystal device, comprising the steps of:

(a) providing a first pair of substrates disposed opposingly with a predetermined spacing, one of the substrates having electrodes and an orientation film formed on a surface thereof facing the other substrate, and the other substrate having an orientation film with optional electrodes formed on a surface thereof facing the one substrate;

(b) providing a second pair of substrates disposed opposingly with a predetermined spacing, one of the substrates having an orientation film with optional electrodes formed on a surface thereof facing the other substrate, and the other substrate having electrodes and an orientation film formed on a surface facing the one substrate;

(d) placing a mixture of a liquid crystal compound and a polymerizable compound within respective predetermined spacings in each of the first, and the second pair of substrates;

(e) polymerizing the polymerizable compound together with the liquid crystal compound under the influence of defining force exerted by the surface of any substrate that has been subjected to an orientation processing and/or in the presence of application of external energy so that the molecules of the liquid crystal compounds so oriented cause the polymerization to form a matrix or network polymer having a selected orientation along the oriented liquid crystal molecules between the respective pairs of substrates;

(f) peeling off the other substrate from the first pair of substrates, to leave the one substrate, comprising a first matrix or network polymer, formed thereon;

(g) peeling off the one substrate from the second pair of substrates, to leave the other substrate, comprising a second matrix or network polymer, formed thereon;

(h) removing the liquid crystal compound from the first and the second matrix or network polymers, obtained in the steps of (f) and (g), respectively, and drying the matrix or network polymers, if desired;

(i) positioning the first matrix or network polymer having the substrate on which the electrodes and the orientation film are formed, and the second matrix or network polymer having the substrate on which the electrodes and the orientation film are formed, such that the electrodes, on the substrate of the first matrix or network polymer, oppose the electrodes on the substrate of the second matrix or network polymer, and laminating the first and the second matrix or network polymers; and (k) adding a liquid crystal compound to the thus-laminated matrix or network polymer between said substrates.

17. The method according to claim 16, wherein the molecules of the liquid crystal compounds are oriented so as to form a predetermined tilt angle with respect to the substrate.

18. The method according to claim 16, wherein, in step (e), said external energy is derived from application of voltage and/or application of a magnetic field.

* * * * *